United States Patent
Yashima et al.

[11] Patent Number: 6,164,747
[45] Date of Patent: Dec. 26, 2000

[54] RECORDING APPARATUS AND METHOD OF CONTROLLING SAME

[75] Inventors: Masataka Yashima, Tokyo; Kenichi Suzuki, Isehara; Keiji Ohkoda, Yokohama; Akihiro Mouri, Kokubunji; Osamu Kanome, Yokohama; Satoshi Shimizu, Yokohama; Tsuyoshi Shibata, Yokohama; Hidehito Takayama, Chigasaki, all of Japan

[73] Assignee: Canon Kabushiki Kaisha, Tokyo, Japan

[21] Appl. No.: 08/982,442

[22] Filed: Dec. 2, 1997

[30] Foreign Application Priority Data

Dec. 4, 1996 [JP] Japan ................... 8-323889
Mar. 28, 1997 [JP] Japan ................... 9-078423
Nov. 25, 1997 [JP] Japan ................... 9-323435

[51] Int. Cl.$^7$ .................. B41J 2/205; B41J 2/21
[52] U.S. Cl. ............................. 347/15; 347/43
[58] Field of Search .................. 347/15, 43, 85–87, 347/37, 20, 40, 12

[56] References Cited

U.S. PATENT DOCUMENTS

| | | | |
|---|---|---|---|
| 4,313,124 | 1/1982 | Hara ............................. | 347/57 |
| 4,345,262 | 8/1982 | Shirato et al. .................. | 347/56 |
| 4,459,600 | 7/1984 | Sato et al. ..................... | 347/47 |
| 4,463,359 | 7/1984 | Ayata et al. .................... | 347/56 |
| 4,558,333 | 12/1985 | Sugitani et al. ................. | 347/65 |
| 4,608,577 | 8/1986 | Hori ............................. | 347/66 |
| 4,686,538 | 8/1987 | Kouzato ......................... | 347/15 |
| 4,723,129 | 2/1988 | Endo et al. ..................... | 347/56 |
| 4,740,796 | 4/1988 | Endo et al. ..................... | 347/56 |
| 4,860,026 | 8/1989 | Matsumoto et al. ................ | 347/15 |
| 5,550,569 | 8/1996 | Wright ........................... | 347/15 |
| 5,825,377 | 10/1998 | Gotoh et al. ..................... | 347/15 |

FOREIGN PATENT DOCUMENTS

| | | |
|---|---|---|
| 0372826 | 6/1990 | European Pat. Off. . |
| 0401023 | 12/1990 | European Pat. Off. . |
| 54-056847 | 5/1979 | Japan . |
| 54-59936 | 5/1979 | Japan . |
| 59-123670 | 7/1984 | Japan . |
| 59-138461 | 8/1984 | Japan . |
| 60-071260 | 4/1985 | Japan . |
| 2-210962 | 8/1990 | Japan . |
| 07125262 | 5/1995 | Japan . |
| 96-12251 | 4/1996 | WIPO . |

OTHER PUBLICATIONS

"Spatial Modulation Transfer in the Human Eye", Floris Van Nes, et al., Journal of the Optical Society of America, vol. 57, No. 3, Mar. 1967, pp. 401–406.

"An Adaptive Algorithm for Spatial Grey Scale", Robert Floyd, et al., SID 75 Digest, First Edition, Apr., 1975, New York, pp. 36–37.

*Primary Examiner*—John Barlow
*Assistant Examiner*—Juanita Stephens
*Attorney, Agent, or Firm*—Fitzpatrick, Cella, Harper & Scinto

[57] ABSTRACT

A recording apparatus includes a recording head for performing recording on recording paper, the recording head having three or more types of inks of different densities but of the same color. A combination of the inks used to record a pixel of a grayscale image, which is to be recorded on the recording paper, is decided based upon the pixel by a data distribution unit which refers to ink density data and combination data. Recording by the recording head is controlled, based upon the combination of inks decided, by a unit which controls the recording head and paper feed.

51 Claims, 28 Drawing Sheets

FIG. 7

| No. | INK A | INK B | INK C | INK D | INK E | INK F | dl [ i ] | th [ i ] |
|---|---|---|---|---|---|---|---|---|
| 0 | ○ | ○ | ○ | ○ | × | × | 0.0 | |
| 1 | ○ | ○ | ○ | × | ○ | × | 8.6 | 4.3 |
| 2 | ○ | ○ | ○ | × | × | × | 17.3 | 13.1 |
| 3 | ○ | ○ | × | ○ | ○ | × | 25.9 | 21.6 |
| 4 | ○ | ○ | × | ○ | × | × | 34.6 | 30.4 |
| 5 | ○ | ○ | × | × | ○ | × | 43.2 | 38.9 |
| 6 | ○ | ○ | × | × | × | × | 51.9 | 47.6 |
| 7 | ○ | × | ○ | ○ | ○ | × | 60.5 | 56.2 |
| 8 | ○ | × | ○ | ○ | × | ○ | 64.8 | 62.7 |
| 9 | ○ | × | ○ | ○ | × | × | 69.2 | 67.0 |
| 10 | ○ | × | ○ | × | ○ | ○ | 73.5 | 71.3 |
| 11 | ○ | × | ○ | × | ○ | × | 77.8 | 75.6 |
| 12 | ○ | × | ○ | × | × | ○ | 82.1 | 80.0 |
| 13 | ○ | × | ○ | × | × | × | 86.4 | 84.3 |
| 14 | ○ | × | × | ○ | ○ | ○ | 90.8 | 88.6 |
| 15 | ○ | × | × | ○ | ○ | × | 95.1 | 92.9 |
| 16 | ○ | × | × | ○ | × | ○ | 99.4 | 97.2 |
| 17 | ○ | × | × | ○ | × | × | 103.7 | 101.6 |
| 18 | ○ | × | × | × | ○ | ○ | 108.1 | 105.9 |
| 19 | ○ | × | × | × | ○ | × | 112.4 | 110.2 |
| 20 | ○ | × | × | × | × | ○ | 116.7 | 114.5 |
| 21 | ○ | × | × | × | × | × | 121.0 | 118.9 |
| 22 | × | ○ | ○ | ○ | ○ | × | 125.3 | 123.2 |
| 23 | × | ○ | ○ | ○ | × | ○ | 129.7 | 127.5 |
| 24 | × | ○ | ○ | ○ | × | × | 134.0 | 131.8 |
| 25 | × | ○ | ○ | × | ○ | ○ | 138.3 | 136.1 |
| 26 | × | ○ | ○ | × | ○ | × | 142.6 | 140.5 |
| 27 | × | ○ | ○ | × | × | ○ | 147.0 | 144.8 |
| 28 | × | ○ | ○ | × | × | × | 151.3 | 149.1 |
| 29 | × | ○ | × | ○ | ○ | ○ | 155.6 | 153.4 |
| 30 | × | ○ | × | ○ | ○ | × | 159.9 | 157.8 |
| 31 | × | ○ | × | ○ | × | ○ | 164.2 | 162.1 |
| 32 | × | ○ | × | ○ | × | × | 168.6 | 166.4 |
| 33 | × | ○ | × | × | ○ | ○ | 172.9 | 170.7 |
| 34 | × | ○ | × | × | ○ | × | 177.2 | 175.0 |
| 35 | × | ○ | × | × | × | ○ | 181.5 | 179.4 |
| 36 | × | ○ | × | × | × | × | 185.9 | 183.7 |
| 37 | × | × | ○ | ○ | ○ | ○ | 190.2 | 188.0 |
| 38 | × | × | ○ | ○ | ○ | × | 194.5 | 192.3 |
| 39 | × | × | ○ | ○ | × | ○ | 198.8 | 196.7 |
| 40 | × | × | ○ | ○ | × | × | 203.1 | 201.0 |
| 41 | × | × | ○ | × | ○ | ○ | 207.5 | 205.3 |
| 42 | × | × | ○ | × | ○ | × | 211.8 | 209.6 |
| 43 | × | × | ○ | × | × | ○ | 216.1 | 213.9 |
| 44 | × | × | ○ | × | × | × | 220.4 | 218.3 |
| 45 | × | × | × | ○ | ○ | ○ | 224.8 | 222.6 |
| 46 | × | × | × | ○ | ○ | × | 229.1 | 226.9 |
| 47 | × | × | × | ○ | × | ○ | 223.4 | 231.2 |
| 48 | × | × | × | ○ | × | × | 237.7 | 235.6 |
| 49 | × | × | × | × | ○ | ○ | 242.0 | 239.9 |
| 50 | × | × | × | × | ○ | × | 246.4 | 244.2 |
| 51 | × | × | × | × | × | ○ | 250.7 | 248.5 |
| 52 | × | × | × | × | × | × | 255.0 | 252.8 |
| * | ○ | ○ | ○ | × | × | ○ | 13.0 | 10.8 |
| * | ○ | ○ | × | ○ | × | ○ | 30.3 | 28.1 |
| * | ○ | ○ | × | × | ○ | ○ | 38.9 | 36.7 |
| * | ○ | ○ | × | × | × | ○ | 47.5 | 45.4 |

FIG. 13

| No. | INK A | INK B | INK C | INK D | dl [ i ] | th [ i ] |
|---|---|---|---|---|---|---|
| 0 | ◎ | ◎ | × | × | 0.0 | |
| 1 | ◎ | ○ | ○ | × | 29.4 | 14.7 |
| 2 | ◎ | ○ | × | × | 44.1 | 36.8 |
| 3 | ◎ | × | ◎ | × | 58.8 | 51.5 |
| 4 | ○ | ◎ | ○ | × | 68.7 | 63.8 |
| 5 | ◎ | × | × | ◎ | 78.5 | 73.6 |
| 6 | ◎ | × | × | × | 88.3 | 83.4 |
| 7 | ○ | ○ | ◎ | × | 98.1 | 93.2 |
| 8 | ○ | ○ | ○ | ○ | 107.9 | 103.0 |
| 9 | ○ | ○ | × | ◎ | 117.7 | 112.8 |
| 10 | ○ | ○ | × | × | 127.5 | 122.6 |
| 11 | ○ | × | ◎ | ○ | 137.3 | 132.4 |
| 12 | ○ | × | ◎ | × | 142.2 | 139.8 |
| 13 | × | ◎ | ○ | ○ | 147.1 | 144.7 |
| 14 | × | ◎ | ○ | × | 152.0 | 149.6 |
| 15 | × | ◎ | × | ◎ | 156.9 | 154.5 |
| 16 | × | ◎ | × | ○ | 161.8 | 159.4 |
| 17 | ○ | × | × | ○ | 166.7 | 164.3 |
| 18 | ○ | × | × | × | 171.6 | 169.2 |
| 19 | × | ○ | ◎ | ○ | 176.5 | 174.1 |
| 20 | × | ○ | ◎ | × | 181.4 | 179.0 |
| 21 | × | ○ | ○ | ◎ | 186.3 | 183.9 |
| 22 | × | ○ | ○ | ○ | 191.3 | 188.8 |
| 23 | × | ○ | ○ | × | 196.2 | 193.8 |
| 24 | × | ○ | × | ◎ | 201.1 | 198.7 |
| 25 | × | ○ | × | ○ | 206.0 | 203.6 |
| 26 | × | ○ | × | × | 210.9 | 208.5 |
| 27 | × | × | ◎ | ◎ | 215.8 | 213.4 |
| 28 | × | × | ◎ | ○ | 220.7 | 218.3 |
| 29 | × | × | ◎ | × | 225.6 | 223.2 |
| 30 | × | × | ○ | ◎ | 230.5 | 228.1 |
| 31 | × | × | ○ | ○ | 235.4 | 233.0 |
| 32 | × | × | ○ | × | 240.3 | 237.9 |
| 33 | × | × | × | ◎ | 245.2 | 242.8 |
| 34 | × | × | × | ○ | 250.1 | 247.7 |
| 35 | × | × | × | × | 255.0 | 252.6 |
| (36) | ○ | × | ○ | ◎ | 39.2 | |
| (37) | × | ○ | × | ◎ | 73.6 | |
| (38) | ○ | × | × | ◎ | 83.4 | |
| (39) | × | ○ | ○ | ◎ | 112.8 | |
| (40) | ○ | × | ○ | ◎ | 122.6 | |
| * | × | ○ | ◎ | ○ | 68.7 | |
| * | ○ | × | ◎ | ○ | 78.5 | |
| * | × | × | ◎ | ○ | 83.4 | |
| * | × | ◎ | ◎ | × | 137.3 | |
| * | ○ | ○ | ◎ | × | 147.1 | |
| * | × | ○ | ◎ | × | 152.0 | |
| * | ◎ | × | ◎ | × | 156.9 | |
| * | ○ | × | ◎ | × | 161.8 | |
| * | × | × | ◎ | × | 166.7 | |

FIG. 15

| No. | INK A | INK B | INK C | INK D | INK E | INK F | INK G | INK H | dl[i] |
|---|---|---|---|---|---|---|---|---|---|
| 0 | ○ | ○ | ○ | ○ | ○ | ○ | ○ | ○ | 0 |
| 1 | ○ | ○ | ○ | ○ | ○ | ○ | ○ | × | 1 |
| 2 | ○ | ○ | ○ | ○ | ○ | ○ | × | ○ | 2 |
| 3 | ○ | ○ | ○ | ○ | ○ | ○ | × | × | 3 |
| 4 | ○ | ○ | ○ | ○ | ○ | × | ○ | ○ | 4 |
| 5 | ○ | ○ | ○ | ○ | ○ | × | ○ | × | 5 |
| 6 | ○ | ○ | ○ | ○ | ○ | × | × | ○ | 6 |
| 7 | ○ | ○ | ○ | ○ | ○ | × | × | × | 7 |
| 8 | ○ | ○ | ○ | ○ | × | ○ | ○ | ○ | 8 |
| 9 | ○ | ○ | ○ | ○ | × | ○ | ○ | × | 9 |
| 10 | ○ | ○ | ○ | ○ | × | ○ | × | ○ | 10 |
| 11 | ○ | ○ | ○ | ○ | × | ○ | × | × | 11 |
| 12 | ○ | ○ | ○ | ○ | × | × | ○ | ○ | 12 |
| 13 | ○ | ○ | ○ | ○ | × | × | ○ | × | 13 |
| 14 | ○ | ○ | ○ | ○ | × | × | × | ○ | 14 |
| 15 | ○ | ○ | ○ | ○ | × | × | × | × | 15 |
| 16 | ○ | ○ | ○ | × | ○ | ○ | ○ | ○ | 16 |
| 17 | ○ | ○ | ○ | × | ○ | ○ | ○ | × | 17 |
| 18 | ○ | ○ | ○ | × | ○ | ○ | × | ○ | 18 |
| 19 | ○ | ○ | ○ | × | ○ | ○ | × | × | 19 |
| 20 | ○ | ○ | ○ | × | ○ | × | ○ | ○ | 20 |
| ... | | | | | | | | | ... |
| 250 | × | × | × | × | × | ○ | × | ○ | 250 |
| 251 | × | × | × | × | × | ○ | × | × | 251 |
| 252 | × | × | × | × | × | × | ○ | ○ | 252 |
| 253 | × | × | × | × | × | × | ○ | × | 253 |
| 254 | × | × | × | × | × | × | × | ○ | 254 |
| 255 | × | × | × | × | × | × | × | × | 255 |

| RATE OF DENSITY | 1 | 2 | 4 | 8 |
|---|---|---|---|---|
| DATA | d1 | d2 | d3 | d4 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

FIG. 23

| RATE OF DENSITY | 1 | 2 | 4 | 8 | 16 |
|---|---|---|---|---|---|
| DATA | d1 | d2 | d3 | d4 | d5 |
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 0 | 0 | 0 | 1 | 0 |
| 9 | 1 | 0 | 0 | 1 | 0 |
| 10 | 0 | 1 | 0 | 1 | 0 |
| 11 | 1 | 1 | 0 | 1 | 0 |
| 12 | 0 | 0 | 1 | 1 | 0 |
| 13 | 1 | 0 | 1 | 1 | 0 |
| 14 | 0 | 1 | 1 | 1 | 0 |
| 15 | 1 | 1 | 1 | 1 | 0 |
| 16 | 0 | 0 | 0 | 0 | 1 |
| 17 | 1 | 0 | 0 | 0 | 1 |
| 18 | 0 | 1 | 0 | 0 | 1 |
| 19 | 1 | 1 | 0 | 0 | 1 |
| 20 | 0 | 0 | 1 | 0 | 1 |
| 21 | 1 | 0 | 1 | 0 | 1 |
| 22 | 0 | 1 | 1 | 0 | 1 |
| 23 | 1 | 1 | 1 | 0 | 1 |
| 24 | 0 | 0 | 0 | 1 | 1 |
| 25 | 1 | 0 | 0 | 1 | 1 |
| 26 | 0 | 1 | 0 | 1 | 1 |
| 27 | 1 | 1 | 0 | 1 | 1 |
| 28 | 0 | 0 | 1 | 1 | 1 |
| 29 | 1 | 0 | 1 | 1 | 1 |
| 30 | 0 | 1 | 1 | 1 | 1 |
| 31 | 1 | 1 | 1 | 1 | 1 |

FIG. 24

| RATE OF DENSITY | 1 | 2 | 4 | 7 | 14 |
|---|---|---|---|---|---|
| DATA | d1 | d2 | d3 | d4 | d5 |
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 1 | 0 | 0 | 1 | 0 |
| 9 | 0 | 1 | 0 | 1 | 0 |
| 10 | 1 | 1 | 0 | 1 | 0 |
| 11 | 0 | 0 | 1 | 1 | 0 |
| 12 | 1 | 0 | 1 | 1 | 0 |
| 13 | 0 | 1 | 1 | 1 | 0 |
| 14 | 0 | 0 | 0 | 0 | 1 |
| 15 | 1 | 0 | 0 | 0 | 1 |
| 16 | 0 | 1 | 0 | 0 | 1 |
| 17 | 1 | 1 | 0 | 0 | 1 |
| 18 | 0 | 0 | 1 | 0 | 1 |
| 19 | 1 | 0 | 1 | 0 | 1 |
| 20 | 0 | 1 | 1 | 0 | 1 |
| 21 | 0 | 0 | 0 | 1 | 1 |
| 22 | 1 | 0 | 0 | 1 | 1 |
| 23 | 0 | 1 | 0 | 1 | 1 |

FIG. 25A

| RATE OF DENSITY | 1 | 2 | 4 | 7 | 14 | 24 |
|---|---|---|---|---|---|---|
| DATA | d1 | d2 | d3 | d4 | d5 | d6 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 1 | 0 | 0 | 1 | 0 | 1 |
| 9 | 0 | 1 | 0 | 1 | 0 | 0 |
| 10 | 1 | 1 | 0 | 1 | 0 | 0 |
| 11 | 0 | 0 | 1 | 1 | 0 | 0 |
| 12 | 1 | 0 | 1 | 1 | 0 | 0 |
| 13 | 0 | 1 | 1 | 1 | 0 | 0 |
| 14 | 0 | 0 | 0 | 0 | 1 | 0 |
| 15 | 1 | 0 | 0 | 0 | 1 | 0 |
| 16 | 0 | 1 | 0 | 0 | 1 | 0 |
| 17 | 1 | 1 | 0 | 0 | 1 | 0 |
| 18 | 0 | 0 | 1 | 0 | 1 | 0 |
| 19 | 1 | 0 | 1 | 0 | 1 | 0 |
| 20 | 0 | 1 | 1 | 0 | 1 | 0 |
| 21 | 0 | 0 | 0 | 1 | 1 | 0 |
| 22 | 1 | 0 | 0 | 1 | 1 | 0 |
| 23 | 0 | 1 | 0 | 1 | 1 | 0 |
| 24 | 0 | 0 | 0 | 0 | 0 | 1 |
| 25 | 1 | 0 | 0 | 0 | 0 | 1 |
| 26 | 0 | 1 | 0 | 0 | 0 | 1 |
| 27 | 1 | 1 | 0 | 0 | 0 | 1 |
| 28 | 0 | 0 | 1 | 0 | 0 | 1 |
| 29 | 1 | 0 | 1 | 0 | 0 | 1 |
| 30 | 0 | 1 | 1 | 0 | 0 | 1 |
| 31 | 0 | 0 | 0 | 1 | 0 | 1 |
| 32 | 1 | 0 | 0 | 1 | 0 | 1 |
| 33 | 0 | 1 | 0 | 1 | 0 | 1 |

FIG. 25B

| RATE OF DENSITY | 1 | 2 | 3 | 6 | 10 | 20 |
|---|---|---|---|---|---|---|
| DATA | d1 | d2 | d3 | d4 | d5 | d6 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 0 | 0 | 1 | 0 | 0 | 0 |
| 4 | 1 | 0 | 1 | 0 | 0 | 0 |
| 5 | 0 | 1 | 1 | 0 | 0 | 0 |
| 6 | 0 | 0 | 0 | 1 | 0 | 0 |
| 7 | 1 | 0 | 0 | 1 | 0 | 0 |
| 8 | 0 | 1 | 0 | 1 | 0 | 0 |
| 9 | 0 | 0 | 1 | 1 | 0 | 0 |
| 10 | 0 | 0 | 0 | 0 | 1 | 0 |
| 11 | 1 | 0 | 0 | 0 | 1 | 0 |
| 12 | 0 | 1 | 0 | 0 | 1 | 0 |
| 13 | 0 | 0 | 1 | 0 | 1 | 0 |
| 14 | 1 | 0 | 1 | 0 | 1 | 0 |
| 15 | 0 | 1 | 1 | 0 | 1 | 0 |
| 16 | 0 | 0 | 0 | 1 | 1 | 0 |
| 17 | 1 | 0 | 0 | 1 | 1 | 0 |
| 18 | 0 | 1 | 0 | 1 | 1 | 0 |
| 19 | 0 | 0 | 1 | 1 | 1 | 0 |
| 20 | 0 | 0 | 0 | 0 | 0 | 1 |
| 21 | 1 | 0 | 0 | 0 | 0 | 1 |
| 22 | 0 | 1 | 0 | 0 | 0 | 1 |
| 23 | 0 | 0 | 1 | 0 | 0 | 1 |
| 24 | 1 | 0 | 1 | 0 | 0 | 1 |
| 25 | 0 | 1 | 1 | 0 | 0 | 1 |
| 26 | 0 | 0 | 0 | 1 | 0 | 1 |
| 27 | 1 | 0 | 0 | 1 | 0 | 1 |
| 28 | 0 | 1 | 0 | 1 | 0 | 1 |
| 29 | 0 | 0 | 1 | 1 | 0 | 1 |
| 30 | 0 | 0 | 0 | 0 | 1 | 1 |
| 31 | 1 | 0 | 0 | 0 | 1 | 1 |
| 32 | 0 | 1 | 0 | 0 | 1 | 1 |
| 33 | 0 | 0 | 1 | 0 | 1 | 1 |

FIG. 26

| RATE OF DENSITY | 1 | 2 | 4 | 8 | 15 | 30 |
|---|---|---|---|---|---|---|
| DATA | d1 | d2 | d3 | d4 | d5 | d6 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| 10 | 0 | 1 | 0 | 1 | 0 | 0 |
| 11 | 1 | 1 | 0 | 1 | 0 | 0 |
| 12 | 0 | 0 | 1 | 1 | 0 | 0 |
| 13 | 1 | 0 | 1 | 1 | 0 | 0 |
| 14 | 0 | 1 | 1 | 1 | 0 | 0 |
| 15 | 0 | 0 | 0 | 0 | 1 | 0 |
| 16 | 1 | 0 | 0 | 0 | 1 | 0 |
| 17 | 0 | 1 | 0 | 0 | 1 | 0 |
| 18 | 1 | 1 | 0 | 0 | 1 | 0 |
| 19 | 0 | 0 | 1 | 0 | 1 | 0 |
| 20 | 1 | 0 | 1 | 0 | 1 | 0 |
| 21 | 0 | 1 | 1 | 0 | 1 | 0 |
| 22 | 1 | 1 | 1 | 0 | 1 | 0 |
| 23 | 0 | 0 | 0 | 1 | 1 | 0 |
| 24 | 1 | 0 | 0 | 1 | 1 | 0 |
| 25 | 0 | 1 | 0 | 1 | 1 | 0 |
| 26 | 1 | 1 | 0 | 1 | 1 | 0 |
| 27 | 0 | 0 | 1 | 1 | 1 | 0 |
| 28 | 1 | 0 | 1 | 1 | 1 | 0 |
| 29 | 0 | 1 | 1 | 1 | 1 | 0 |
| 30 | 0 | 0 | 0 | 0 | 0 | 1 |
| 31 | 1 | 0 | 0 | 0 | 0 | 1 |
| 32 | 0 | 1 | 0 | 0 | 0 | 1 |
| 33 | 1 | 1 | 0 | 0 | 0 | 1 |
| 34 | 0 | 0 | 1 | 0 | 0 | 1 |
| 35 | 1 | 0 | 1 | 0 | 0 | 1 |
| 36 | 0 | 1 | 1 | 0 | 0 | 1 |
| 37 | 1 | 1 | 1 | 0 | 0 | 1 |
| 38 | 0 | 0 | 0 | 1 | 0 | 1 |
| 39 | 1 | 0 | 0 | 1 | 0 | 1 |
| 40 | 0 | 1 | 0 | 1 | 0 | 1 |
| 41 | 1 | 1 | 0 | 1 | 0 | 1 |
| 42 | 0 | 0 | 1 | 1 | 0 | 1 |
| 43 | 1 | 0 | 1 | 1 | 0 | 1 |
| 44 | 0 | 1 | 1 | 1 | 0 | 1 |
| 45 | 0 | 0 | 0 | 0 | 1 | 1 |
| 46 | 1 | 0 | 0 | 0 | 1 | 1 |
| 47 | 0 | 1 | 0 | 0 | 1 | 1 |
| 48 | 1 | 1 | 0 | 0 | 1 | 1 |
| 49 | 0 | 0 | 1 | 0 | 1 | 1 |
| 50 | 1 | 0 | 1 | 0 | 1 | 1 |
| 51 | 0 | 1 | 1 | 0 | 1 | 1 |

FIG. 27A

| RATE OF DENSITY | 1 | 2 | 3 | 6 | 10 | 20 | 34 | 68 | 102 | 136 |
|---|---|---|---|---|---|---|---|---|---|---|
| DATA | d1 | d2 | d3 | d4 | d5 | d6 | d7 | d8 | d9 | d10 |
| 0 | 0 | 0 | 0 | 0 | 0 | 0 | 0 | 0 | 0 | 0 |
| 1 | 1 | 0 | 0 | 0 | 0 | 0 | 0 | 0 | 0 | 0 |
| 2 | 0 | 1 | 0 | 0 | 0 | 0 | 0 | 0 | 0 | 0 |
| 3 | 0 | 0 | 1 | 0 | 0 | 0 | 0 | 0 | 0 | 0 |
| 4 | 1 | 0 | 1 | 0 | 0 | 0 | 0 | 0 | 0 | 0 |
| 5 | 0 | 1 | 1 | 0 | 0 | 0 | 0 | 0 | 0 | 0 |
| 6 | 0 | 0 | 0 | 1 | 0 | 0 | 0 | 0 | 0 | 0 |
| 7 | 1 | 0 | 0 | 1 | 0 | 0 | 0 | 0 | 0 | 0 |
| 8 | 0 | 1 | 0 | 1 | 0 | 0 | 0 | 0 | 0 | 0 |
| 9 | 0 | 0 | 1 | 1 | 0 | 0 | 0 | 0 | 0 | 0 |
| 10 | 0 | 0 | 0 | 0 | 1 | 0 | 0 | 0 | 0 | 0 |
| 11 | 1 | 0 | 0 | 0 | 1 | 0 | 0 | 0 | 0 | 0 |
| 12 | 0 | 1 | 0 | 0 | 1 | 0 | 0 | 0 | 0 | 0 |
| 13 | 0 | 0 | 1 | 0 | 1 | 0 | 0 | 0 | 0 | 0 |
| 14 | 1 | 0 | 1 | 0 | 1 | 0 | 0 | 0 | 0 | 0 |
| 15 | 0 | 1 | 1 | 0 | 1 | 0 | 0 | 0 | 0 | 0 |
| 16 | 0 | 0 | 0 | 1 | 1 | 0 | 0 | 0 | 0 | 0 |
| 17 | 1 | 0 | 0 | 1 | 1 | 0 | 0 | 0 | 0 | 0 |
| 18 | 0 | 1 | 0 | 1 | 1 | 0 | 0 | 0 | 0 | 0 |
| 19 | 0 | 0 | 1 | 1 | 1 | 0 | 0 | 0 | 0 | 0 |
| 20 | 0 | 0 | 0 | 0 | 0 | 1 | 0 | 0 | 0 | 0 |
| 21 | 1 | 0 | 0 | 0 | 0 | 1 | 0 | 0 | 0 | 0 |
| 22 | 0 | 1 | 0 | 0 | 0 | 1 | 0 | 0 | 0 | 0 |
| 23 | 0 | 0 | 1 | 0 | 0 | 1 | 0 | 0 | 0 | 0 |
| 24 | 1 | 0 | 1 | 0 | 0 | 1 | 0 | 0 | 0 | 0 |
| 25 | 0 | 1 | 1 | 0 | 0 | 1 | 0 | 0 | 0 | 0 |
| 26 | 0 | 0 | 0 | 1 | 0 | 1 | 0 | 0 | 0 | 0 |
| 27 | 1 | 0 | 1 | 1 | 0 | 1 | 0 | 0 | 0 | 0 |
| 28 | 0 | 1 | 1 | 1 | 0 | 1 | 0 | 0 | 0 | 0 |
| 29 | 0 | 0 | 1 | 1 | 0 | 1 | 0 | 0 | 0 | 0 |
| 30 | 0 | 0 | 0 | 0 | 1 | 1 | 0 | 0 | 0 | 0 |
| 31 | 1 | 0 | 0 | 0 | 1 | 1 | 0 | 0 | 0 | 0 |
| 32 | 0 | 1 | 0 | 0 | 1 | 1 | 0 | 0 | 0 | 0 |
| 33 | 0 | 0 | 1 | 0 | 1 | 1 | 0 | 0 | 0 | 0 |
| 34 | 0 | 0 | 0 | 0 | 0 | 0 | 1 | 0 | 0 | 0 |
| 35 | 1 | 0 | 0 | 0 | 0 | 0 | 1 | 0 | 0 | 0 |
| 36 | 0 | 1 | 0 | 0 | 0 | 0 | 1 | 0 | 0 | 0 |
| 37 | 0 | 0 | 1 | 0 | 0 | 0 | 1 | 0 | 0 | 0 |
| 38 | 1 | 0 | 1 | 0 | 0 | 0 | 1 | 0 | 0 | 0 |
| 39 | 0 | 1 | 1 | 0 | 0 | 0 | 1 | 0 | 0 | 0 |
| 40 | 0 | 0 | 0 | 1 | 0 | 0 | 1 | 0 | 0 | 0 |
| 41 | 1 | 0 | 0 | 1 | 0 | 0 | 1 | 0 | 0 | 0 |
| 42 | 0 | 1 | 0 | 1 | 0 | 0 | 1 | 0 | 0 | 0 |
| 43 | 0 | 0 | 1 | 1 | 0 | 0 | 1 | 0 | 0 | 0 |
| 44 | 0 | 0 | 0 | 0 | 1 | 0 | 1 | 0 | 0 | 0 |
| 45 | 1 | 0 | 0 | 0 | 1 | 0 | 1 | 0 | 0 | 0 |
| 46 | 0 | 1 | 0 | 0 | 1 | 0 | 1 | 0 | 0 | 0 |
| 47 | 0 | 0 | 1 | 0 | 1 | 0 | 1 | 0 | 0 | 0 |
| 48 | 1 | 0 | 1 | 0 | 1 | 0 | 1 | 0 | 0 | 0 |
| 49 | 0 | 1 | 1 | 0 | 1 | 0 | 1 | 0 | 0 | 0 |
| 50 | 0 | 0 | 0 | 1 | 1 | 0 | 1 | 0 | 0 | 0 |
| 51 | 1 | 0 | 0 | 1 | 1 | 0 | 1 | 0 | 0 | 0 |
| 52 | 0 | 1 | 0 | 1 | 1 | 0 | 1 | 0 | 0 | 0 |
| 53 | 0 | 0 | 1 | 1 | 1 | 0 | 1 | 0 | 0 | 0 |
| 54 | 0 | 0 | 0 | 0 | 0 | 1 | 1 | 0 | 0 | 0 |
| 55 | 1 | 0 | 0 | 0 | 0 | 1 | 1 | 0 | 0 | 0 |
| 56 | 0 | 1 | 0 | 0 | 0 | 1 | 1 | 0 | 0 | 0 |
| 57 | 0 | 0 | 1 | 0 | 0 | 1 | 1 | 0 | 0 | 0 |
| 58 | 1 | 0 | 1 | 0 | 0 | 1 | 1 | 0 | 0 | 0 |
| 59 | 0 | 1 | 1 | 0 | 0 | 1 | 1 | 0 | 0 | 0 |

FIG. 27B

| RATE OF DENSITY | 1 | 2 | 3 | 6 | 10 | 20 | 34 | 68 | 102 | 136 |
|---|---|---|---|---|---|---|---|---|---|---|
| DATA | d1 | d2 | d3 | d4 | d5 | d6 | d7 | d8 | d9 | d10 |
| 60 | 0 | 0 | 0 | 1 | 0 | 1 | 1 | 0 | 0 | 0 |
| 61 | 1 | 0 | 0 | 1 | 0 | 1 | 1 | 0 | 0 | 0 |
| 62 | 0 | 1 | 0 | 1 | 0 | 1 | 1 | 0 | 0 | 0 |
| 63 | 0 | 0 | 1 | 1 | 0 | 1 | 1 | 0 | 0 | 0 |
| 64 | 0 | 0 | 0 | 0 | 1 | 1 | 1 | 0 | 0 | 0 |
| 65 | 1 | 0 | 0 | 0 | 1 | 1 | 1 | 0 | 0 | 0 |
| 66 | 0 | 1 | 0 | 0 | 1 | 1 | 1 | 0 | 0 | 0 |
| 67 | 0 | 0 | 1 | 0 | 1 | 1 | 1 | 0 | 0 | 0 |
| 68 | 0 | 0 | 0 | 0 | 0 | 0 | 0 | 1 | 0 | 0 |
| 69 | 1 | 0 | 0 | 0 | 0 | 0 | 0 | 1 | 0 | 0 |
| 70 | 0 | 1 | 0 | 0 | 0 | 0 | 0 | 1 | 0 | 0 |
| 71 | 0 | 0 | 1 | 0 | 0 | 0 | 0 | 1 | 0 | 0 |
| 72 | 1 | 0 | 1 | 0 | 0 | 0 | 0 | 1 | 0 | 0 |
| 73 | 0 | 1 | 1 | 0 | 0 | 0 | 0 | 1 | 0 | 0 |
| 74 | 0 | 0 | 0 | 1 | 0 | 0 | 0 | 1 | 0 | 0 |
| 75 | 1 | 0 | 0 | 1 | 0 | 0 | 0 | 1 | 0 | 0 |
| 76 | 0 | 1 | 0 | 1 | 0 | 0 | 0 | 1 | 0 | 0 |
| 77 | 0 | 0 | 1 | 1 | 0 | 0 | 0 | 1 | 0 | 0 |
| 78 | 0 | 0 | 0 | 0 | 1 | 0 | 0 | 1 | 0 | 0 |
| 79 | 1 | 0 | 0 | 0 | 1 | 0 | 0 | 1 | 0 | 0 |
| 80 | 0 | 1 | 0 | 0 | 1 | 0 | 0 | 1 | 0 | 0 |
| 81 | 0 | 0 | 1 | 0 | 1 | 0 | 0 | 1 | 0 | 0 |
| 82 | 1 | 0 | 1 | 0 | 1 | 0 | 0 | 1 | 0 | 0 |
| 83 | 0 | 1 | 1 | 0 | 1 | 0 | 0 | 1 | 0 | 0 |
| 84 | 0 | 0 | 0 | 1 | 1 | 0 | 0 | 1 | 0 | 0 |
| 85 | 1 | 0 | 0 | 1 | 1 | 0 | 0 | 1 | 0 | 0 |
| 86 | 0 | 1 | 0 | 1 | 1 | 0 | 0 | 1 | 0 | 0 |
| 87 | 0 | 0 | 1 | 1 | 1 | 0 | 0 | 1 | 0 | 0 |
| 88 | 0 | 0 | 0 | 0 | 0 | 0 | 1 | 1 | 0 | 0 |
| 89 | 1 | 0 | 0 | 0 | 0 | 0 | 1 | 1 | 0 | 0 |
| 90 | 0 | 1 | 0 | 0 | 0 | 0 | 1 | 1 | 0 | 0 |
| 91 | 0 | 0 | 1 | 0 | 0 | 0 | 1 | 1 | 0 | 0 |
| 92 | 1 | 0 | 1 | 0 | 0 | 0 | 1 | 1 | 0 | 0 |
| 93 | 0 | 1 | 1 | 0 | 0 | 0 | 1 | 1 | 0 | 0 |
| 94 | 0 | 0 | 0 | 1 | 0 | 0 | 1 | 1 | 0 | 0 |
| 95 | 1 | 0 | 0 | 1 | 0 | 0 | 1 | 1 | 0 | 0 |
| 96 | 0 | 1 | 0 | 1 | 0 | 0 | 1 | 1 | 0 | 0 |
| 97 | 0 | 0 | 1 | 1 | 0 | 0 | 1 | 1 | 0 | 0 |
| 98 | 0 | 0 | 0 | 0 | 1 | 0 | 1 | 1 | 0 | 0 |
| 99 | 1 | 0 | 0 | 0 | 1 | 0 | 1 | 1 | 0 | 0 |
| 100 | 0 | 1 | 0 | 0 | 1 | 0 | 1 | 1 | 0 | 0 |
| 101 | 0 | 0 | 1 | 0 | 1 | 0 | 1 | 1 | 0 | 0 |
| 102 | 0 | 0 | 0 | 0 | 0 | 0 | 0 | 0 | 1 | 0 |
| 103 | 1 | 0 | 0 | 0 | 0 | 0 | 0 | 0 | 1 | 0 |
| 104 | 0 | 1 | 0 | 0 | 0 | 0 | 0 | 0 | 1 | 0 |
| 105 | 0 | 0 | 1 | 0 | 0 | 0 | 0 | 0 | 1 | 0 |
| 106 | 1 | 0 | 1 | 0 | 0 | 0 | 0 | 0 | 1 | 0 |
| 107 | 0 | 1 | 1 | 0 | 0 | 0 | 0 | 0 | 1 | 0 |
| 108 | 0 | 0 | 0 | 1 | 0 | 0 | 0 | 0 | 1 | 0 |
| 109 | 1 | 0 | 0 | 1 | 0 | 0 | 0 | 0 | 1 | 0 |
| 110 | 0 | 1 | 0 | 1 | 0 | 0 | 0 | 0 | 1 | 0 |
| 111 | 0 | 0 | 1 | 1 | 0 | 0 | 0 | 0 | 1 | 0 |
| 112 | 0 | 0 | 0 | 0 | 1 | 0 | 0 | 0 | 1 | 0 |
| 113 | 1 | 0 | 0 | 0 | 1 | 0 | 0 | 0 | 1 | 0 |
| 114 | 0 | 1 | 0 | 0 | 1 | 0 | 0 | 0 | 1 | 0 |
| 115 | 0 | 0 | 1 | 0 | 1 | 0 | 0 | 0 | 1 | 0 |
| 116 | 1 | 0 | 1 | 0 | 1 | 0 | 0 | 0 | 1 | 0 |
| 117 | 0 | 1 | 1 | 0 | 1 | 0 | 0 | 0 | 1 | 0 |
| 118 | 0 | 0 | 0 | 1 | 1 | 0 | 0 | 0 | 1 | 0 |
| 119 | 1 | 0 | 0 | 1 | 1 | 0 | 0 | 0 | 1 | 0 |

FIG. 27C

| RATE OF DENSITY | 1 | 2 | 3 | 6 | 10 | 20 | 34 | 68 | 102 | 136 |
|---|---|---|---|---|---|---|---|---|---|---|
| DATA | d1 | d2 | d3 | d4 | d5 | d6 | d7 | d8 | d9 | d10 |
| 120 | 0 | 1 | 0 | 1 | 1 | 0 | 0 | 0 | 1 | 0 |
| 121 | 0 | 0 | 1 | 1 | 1 | 0 | 0 | 0 | 1 | 0 |
| 122 | 0 | 0 | 0 | 0 | 0 | 1 | 0 | 0 | 1 | 0 |
| 123 | 1 | 0 | 0 | 0 | 0 | 1 | 0 | 0 | 1 | 0 |
| 124 | 0 | 1 | 0 | 0 | 0 | 1 | 0 | 0 | 1 | 0 |
| 125 | 0 | 0 | 1 | 0 | 0 | 1 | 0 | 0 | 1 | 0 |
| 126 | 1 | 0 | 1 | 0 | 0 | 1 | 0 | 0 | 1 | 0 |
| 127 | 0 | 1 | 1 | 0 | 0 | 1 | 0 | 0 | 1 | 0 |
| 128 | 0 | 0 | 0 | 1 | 0 | 1 | 0 | 0 | 1 | 0 |
| 129 | 1 | 0 | 0 | 1 | 0 | 1 | 0 | 0 | 1 | 0 |
| 130 | 0 | 1 | 0 | 1 | 0 | 1 | 0 | 0 | 1 | 0 |
| 131 | 0 | 0 | 1 | 1 | 0 | 1 | 0 | 0 | 1 | 0 |
| 132 | 0 | 0 | 0 | 0 | 1 | 1 | 0 | 0 | 1 | 0 |
| 133 | 1 | 0 | 0 | 0 | 1 | 1 | 0 | 0 | 1 | 0 |
| 134 | 0 | 1 | 0 | 0 | 1 | 1 | 0 | 0 | 1 | 0 |
| 135 | 0 | 0 | 1 | 0 | 1 | 1 | 0 | 0 | 1 | 0 |
| 136 | 0 | 0 | 0 | 0 | 0 | 0 | 0 | 0 | 0 | 1 |
| 137 | 1 | 0 | 0 | 0 | 0 | 0 | 0 | 0 | 0 | 1 |
| 138 | 0 | 1 | 0 | 0 | 0 | 0 | 0 | 0 | 0 | 1 |
| 139 | 0 | 0 | 1 | 0 | 0 | 0 | 0 | 0 | 0 | 1 |
| 140 | 1 | 0 | 1 | 0 | 0 | 0 | 0 | 0 | 0 | 1 |
| 141 | 0 | 1 | 1 | 0 | 0 | 0 | 0 | 0 | 0 | 1 |
| 142 | 0 | 0 | 0 | 1 | 0 | 0 | 0 | 0 | 0 | 1 |
| 143 | 1 | 0 | 0 | 1 | 0 | 0 | 0 | 0 | 0 | 1 |
| 144 | 0 | 1 | 0 | 1 | 0 | 0 | 0 | 0 | 0 | 1 |
| 145 | 0 | 0 | 1 | 1 | 0 | 0 | 0 | 0 | 0 | 1 |
| 146 | 0 | 0 | 0 | 0 | 1 | 0 | 0 | 0 | 0 | 1 |
| 147 | 1 | 0 | 0 | 0 | 1 | 0 | 0 | 0 | 0 | 1 |
| 148 | 0 | 1 | 0 | 0 | 1 | 0 | 0 | 0 | 0 | 1 |
| 149 | 0 | 0 | 1 | 0 | 1 | 0 | 0 | 0 | 0 | 1 |
| 150 | 1 | 0 | 1 | 0 | 1 | 0 | 0 | 0 | 0 | 1 |
| 151 | 0 | 1 | 1 | 0 | 1 | 0 | 0 | 0 | 0 | 1 |
| 152 | 0 | 0 | 0 | 1 | 1 | 0 | 0 | 0 | 0 | 1 |
| 153 | 1 | 0 | 0 | 1 | 1 | 0 | 0 | 0 | 0 | 1 |
| 154 | 0 | 1 | 0 | 1 | 1 | 0 | 0 | 0 | 0 | 1 |
| 155 | 0 | 0 | 1 | 1 | 1 | 0 | 0 | 0 | 0 | 1 |
| 156 | 0 | 0 | 0 | 0 | 0 | 1 | 0 | 0 | 0 | 1 |
| 157 | 1 | 0 | 0 | 0 | 0 | 1 | 0 | 0 | 0 | 1 |
| 158 | 0 | 1 | 0 | 0 | 0 | 1 | 0 | 0 | 0 | 1 |
| 159 | 0 | 0 | 1 | 0 | 0 | 1 | 0 | 0 | 0 | 1 |
| 160 | 1 | 0 | 1 | 0 | 0 | 1 | 0 | 0 | 0 | 1 |
| 161 | 0 | 1 | 1 | 0 | 0 | 1 | 0 | 0 | 0 | 1 |
| 162 | 0 | 0 | 0 | 1 | 0 | 1 | 0 | 0 | 0 | 1 |
| 163 | 1 | 0 | 0 | 1 | 0 | 1 | 0 | 0 | 0 | 1 |
| 164 | 0 | 1 | 0 | 1 | 0 | 1 | 0 | 0 | 0 | 1 |
| 165 | 0 | 0 | 1 | 1 | 0 | 1 | 0 | 0 | 0 | 1 |
| 166 | 0 | 0 | 0 | 0 | 1 | 1 | 0 | 0 | 0 | 1 |
| 167 | 1 | 0 | 0 | 0 | 1 | 1 | 0 | 0 | 0 | 1 |
| 168 | 0 | 1 | 0 | 0 | 1 | 1 | 0 | 0 | 0 | 1 |
| 169 | 0 | 0 | 1 | 0 | 1 | 1 | 0 | 0 | 0 | 1 |

FIG. 28A

| RATE OF DENSITY | 1 | 2 | 4 | 8 | 15 | 28 |
|---|---|---|---|---|---|---|
| DATA | d1 | d2 | d3 | d4 | d5 | d6 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| 10 | 0 | 1 | 0 | 1 | 0 | 0 |
| 11 | 1 | 1 | 0 | 1 | 0 | 0 |
| 12 | 0 | 0 | 1 | 1 | 0 | 0 |
| 13 | 1 | 0 | 1 | 1 | 0 | 0 |
| 14 | 0 | 1 | 1 | 1 | 0 | 0 |
| 15 | 0 | 0 | 0 | 0 | 1 | 0 |
| 16 | 1 | 0 | 0 | 0 | 1 | 0 |
| 17 | 0 | 1 | 0 | 0 | 1 | 0 |
| 18 | 1 | 1 | 0 | 0 | 1 | 0 |
| 19 | 0 | 0 | 1 | 0 | 1 | 0 |
| 20 | 1 | 0 | 1 | 0 | 1 | 0 |
| 21 | 0 | 1 | 1 | 0 | 1 | 0 |
| 22 | 1 | 1 | 1 | 0 | 1 | 0 |
| 23 | 0 | 0 | 0 | 1 | 1 | 0 |
| 24 | 1 | 0 | 0 | 1 | 1 | 0 |
| 25 | 0 | 1 | 0 | 1 | 1 | 0 |
| 26 | 1 | 1 | 0 | 1 | 1 | 0 |
| 27 | 0 | 0 | 1 | 1 | 1 | 0 |
| 28 | 0 | 0 | 0 | 0 | 0 | 1 |
| 29 | 1 | 0 | 0 | 0 | 0 | 1 |
| 30 | 0 | 1 | 0 | 0 | 0 | 1 |
| 31 | 1 | 1 | 0 | 0 | 0 | 1 |
| 32 | 0 | 0 | 1 | 0 | 0 | 1 |
| 33 | 1 | 0 | 1 | 0 | 0 | 1 |
| 34 | 0 | 1 | 1 | 0 | 0 | 1 |
| 35 | 1 | 1 | 1 | 0 | 0 | 1 |
| 36 | 0 | 0 | 0 | 1 | 0 | 1 |
| 37 | 1 | 0 | 0 | 1 | 0 | 1 |
| 38 | 0 | 1 | 0 | 1 | 0 | 1 |
| 39 | 1 | 1 | 0 | 1 | 0 | 1 |
| 40 | 0 | 0 | 1 | 1 | 0 | 1 |
| 41 | 1 | 0 | 1 | 1 | 0 | 1 |
| 42 | 0 | 1 | 1 | 1 | 0 | 1 |
| 43 | 0 | 0 | 0 | 0 | 1 | 1 |
| 44 | 1 | 0 | 0 | 0 | 1 | 1 |
| 45 | 0 | 1 | 0 | 0 | 1 | 1 |
| 46 | 1 | 1 | 0 | 0 | 1 | 1 |
| 47 | 0 | 0 | 1 | 0 | 1 | 1 |
| 48 | 1 | 0 | 1 | 0 | 1 | 1 |
| 49 | 0 | 1 | 1 | 0 | 1 | 1 |

FIG. 28B

| RATE OF DENSITY | 1 | 2 | 4 | 8 | 15 | 30 |
|---|---|---|---|---|---|---|
| DATA | d1 | d2 | d3 | d4 | d5 | d6 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| 10 | 0 | 1 | 0 | 1 | 0 | 0 |
| 11 | 1 | 1 | 0 | 1 | 0 | 0 |
| 12 | 0 | 0 | 1 | 1 | 0 | 0 |
| 13 | 1 | 0 | 1 | 1 | 0 | 0 |
| 14 | 0 | 1 | 1 | 1 | 0 | 0 |
| 15 | 0 | 0 | 0 | 0 | 1 | 0 |
| 16 | 1 | 0 | 0 | 0 | 1 | 0 |
| 17 | 0 | 1 | 0 | 0 | 1 | 0 |
| 18 | 1 | 1 | 0 | 0 | 1 | 0 |
| 19 | 0 | 0 | 1 | 0 | 1 | 0 |
| 20 | 1 | 0 | 1 | 0 | 1 | 0 |
| 21 | 0 | 1 | 1 | 0 | 1 | 0 |
| 22 | 1 | 1 | 1 | 0 | 1 | 0 |
| 23 | 0 | 0 | 0 | 1 | 1 | 0 |
| 24 | 1 | 0 | 0 | 1 | 1 | 0 |
| 25 | 0 | 1 | 0 | 1 | 1 | 0 |
| 26 | 1 | 1 | 0 | 1 | 1 | 0 |
| 27 | 0 | 0 | 1 | 1 | 1 | 0 |
| 28 | 0 | 1 | 0 | 0 | 0 | 1 |
| 29 | 0 | 1 | 1 | 1 | 1 | 0 |
| 30 | 0 | 0 | 0 | 0 | 0 | 1 |
| 31 | 1 | 0 | 0 | 0 | 0 | 1 |
| 32 | 0 | 1 | 0 | 0 | 0 | 1 |
| 33 | 1 | 1 | 0 | 0 | 0 | 1 |
| 34 | 0 | 0 | 1 | 0 | 0 | 1 |
| 35 | 1 | 0 | 1 | 0 | 0 | 1 |
| 36 | 0 | 1 | 1 | 0 | 0 | 1 |
| 37 | 1 | 1 | 1 | 0 | 0 | 1 |
| 38 | 0 | 0 | 0 | 1 | 0 | 1 |
| 39 | 1 | 0 | 0 | 1 | 0 | 1 |
| 40 | 0 | 1 | 0 | 1 | 0 | 1 |
| 41 | 1 | 1 | 0 | 1 | 0 | 1 |
| 42 | 0 | 0 | 1 | 1 | 0 | 1 |
| 43 | 1 | 0 | 1 | 1 | 0 | 1 |
| 44 | 1 | 1 | 1 | 1 | 0 | 1 |
| 45 | 0 | 0 | 0 | 0 | 1 | 1 |
| 46 | 1 | 1 | 0 | 0 | 1 | 1 |
| 47 | 0 | 1 | 0 | 0 | 1 | 1 |
| 48 | 1 | 1 | 0 | 0 | 1 | 1 |
| 49 | 0 | 0 | 1 | 0 | 1 | 1 |

RECORDING APPARATUS AND METHOD OF CONTROLLING SAME

BACKGROUND OF THE INVENTION

This invention relates to a recording apparatus for recording a grayscale image on a recording medium based upon input image data, as well as to a method of controlling this apparatus.

The growing popularity of copiers, information processors such as word processors and computers and communications equipment has given rise to the rapid spread of image forming (recording) devices for these apparatus, one example of such a device being a printer which performs digital image recording using an ink-jet recording head. In addition, the higher quality and colorization of visual information in the aforesaid information processors and communications equipment has been accompanied by increasing demand for higher image quality and colorization in recording apparatus as well.

In such a recording apparatus, use is made of a recording head (referred to as a "multihead" below) comprising a plurality of recording elements in an integrated array for the purpose of producing finer pixels, one example being an arrangement in which a plurality of ink discharge ports and ink passageways are integrated at high density. In order to produce colors, the general practice is to use an apparatus having a plurality of the aforesaid multiheads corresponding to the inks used, namely inks of the colors cyan, magenta, yellow and black.

There is a fixed limit, however, in the degree to which ink discharge ports and ink passageways can be densely integrated, and hence there is a fixed limit in the degree to which finer pixels can be produced. As a consequence, the dots which form the pixels are comparatively large and result in a grainy appearance at locations where there are image highlights having low density. This gives rise to problems in terms of improving image quality.

Instead of raising the density of integration of the ink discharge ports and ink passageways, i.e., instead of reducing the size of the individual pixels, it is known to employ a so-called multidrop technique through which the dots of the jetted ink are reduced so that each individual pixel will be formed by ink droplets the number of which conforms to the recording density. With the multidrop technique, the diameter of an ink dot recorded on recording paper can be made comparatively small, thus making it possible to diminish the graininess at low-density portions such as the highlight portions of an image. However, owing to a balance which must be achieved between the reduction in ink dot size and the stability of the ink jetting operation when small ink droplets are discharged, there is a certain limit upon the reduction in ink dot size as well. This places a limit upon improvements in image quality. Further, this technique is such that the higher the density, the greater the number of ink drops jetted for one pixel, as a result of which there is a decline in recording speed. This means that improvement in image quality and recording speed are mutually contradictory.

A known method of improving image quality without raising the integration density of the discharge ports is continuous tone recording using toned inks of the same color but of different ink concentrations. According to continuous tone recording, highlight portions are recorded using diluted ink, namely ink of low density, to make the graininess of the ink dots appear less conspicuous, and high-density portions are recorded using concentrated ink. As a result, high-density portions can be produced without doing so by increasing the number of ink drops discharged as in the multidrop method. This makes it possible to suppress a decline in recording speed. Further, with the continuous tone recording method, inks for expressing output image density signal level corresponding to input image density signal level are decided using a tone allocation table of the kind exemplified in FIG. 16.

FIG. 16 shows an example of a tone allocation table when inks of four colors (K, C, M, Y) are used and each ink is of three types (concentrated ink, medium ink and diluted ink).

As shown in FIG. 16, the tone allocation table indicates types of ink for expressing an output image density signal level that corresponds to an input image density signal level. When a recording operation is performed, the tone allocation table is used to develop an input image in conformity with ink for expressing an output image density signal level that corresponds to an input image density signal level. It should be noted that the tone allocation table is designed in dependence upon the percentage of pigment density in such a manner that the value of an input image density signal and the value of reflected density after recording will exhibit a proportional relationship.

When the type of ink which expresses the output image density signal level has been decided from the tone allocation table, the output image density signal level is subjected to binarization processing by a binarizing circuit to produce image signals Kconc, Kmed, Kdil, Cconc, Cmed, Cdil, Mcon, Mmed, Mdil, Yconc, Ymed, Ydill transferred to 12 multiheads.

In an image recorded by the arrangement described above, low-density areas such as image highlight portions are recorded using diluted ink so that the ink dots will not be too conspicuous, and high-density portions are recorded using medium ink and concentrated ink. As a result, image quality can be improved over that obtained with the multidrop method.

The dither method, error diffusion method and average density preservation method are known as known as methods of pseudo-halftone processing based upon binarization mentioned above.

The dither method binarizes the data of each individual pixel by a threshold value of each pixel decided by a dither matrix.

The error diffusion method, as described in "An Adaptive Algorithm for Spatial Gray Scale", by R. Floyd and L. Steinberg, SID 75 Digest, pp. 36~37, binarizes multilevel image data of a pixel of interest (i.e., converts the data to a maximum level or minimum level), calculates the error between a binarized level and the immediately preceding binarized level, diffuses the error to other pixels and adds the error.

The average density preservation method, as described in the specification of Japanese Patent Application Laid-Open No. 2-210962, obtains a threshold value based upon bilevel data obtained by binarization already performed in the vicinity of a pixel of interest, or data which includes the results of binarizing a pixel of interest to black or white, and binarizes the image data of the pixel of interest based upon this threshold value.

However, these conventional methods involve a number of difficulties. For example, in a situation where the output image is a transparency image such as X-ray film for medical purposes, visual resolution with respect to density is high. As a result, even if use is made of concentrated and diluted inks, a difference in density from one pixel to the next can be recognized and the impression that is given is one of a coarse image. In other words, it is necessary to increase further the number of tones of each pixel. In order to achieve this, however, it is necessary to increase the number of types of concentrated and diluted inks and to provide a correspondingly large number of recording heads conforming to the number of inks. The result is a considerable increase in cost.

SUMMARY OF THE INVENTION

Accordingly, an object of the present invention is to provide a recording apparatus capable of recording an excellent grayscale image without a major increase in cost, as well as a method of controlling this apparatus.

According to the present invention, the foregoing object is attained by providing a recording apparatus for recording a grayscale image on a recording medium based upon input image data, comprising: recording means for performing recording on the recording medium, the recording means having three or more types of recording agents of different densities but of the same color; decision means for deciding a combination of the types of recording agents used to record a pixel of the grayscale image that is to be recorded on the recording medium, the combination being decided based upon the pixel; and control means for controlling recording by the recording means based upon the input image data and the combination of recording agents decided by the decision means.

The decision means includes memory means for storing density levels capable of being expressed by combining one or more of the recording agents possessed by said recording means, as well as information relating to combinations of the recording agents which express the density levels, and multilevel conversion means for converting the input image data to multiple levels based upon a density level that has been stored in the memory means, wherein a combination of recording agents used to record a pixel of the grayscale image that is to be recorded on the recording medium is decided by being acquired from the memory means based upon the density level of a pixel of the input image data converted to multiple levels by the multilevel conversion means.

It is preferred that the multilevel conversion means convert the input image data to a number of levels that is greater than at least n+1, where n represents the number of types of recording agents possessed by the recording means.

The density levels of the multilevel conversion preferably are decided upon taking visual characeristics into account.

In regard to visual characteristics, the minimum recognizable difference in density depends upon the particular background density, as described for example in "Optimum Density and Optimum Range of Densities of X-ray Photographs" in the periodical Japanese Society of Radiology, Vol. 3, 1981, pp. 324~334. As shown in FIG. 17, which illustrates one example of this, the absolute value of minimum recognizable density difference varies depending upon the conditions of observation. In general, however, as background density increases, so does the minimum recognizable density difference.

As indicated for example in "Spatial Modulation Transfer in the Human Eye", by Floris Van Nes and Maarteen A. Bauman, Journal of the Optical Society of America, Vol. 57, No. 3, 1967, pp. 401~406, the relationship between resolution and visual characteristics is such that the maximum recognition rate is obtained at a spatial frequency of 1~cycle/mm, though the recognition rate declines as spatial frequency deviates from this value.

With regard to the density levels of the multilevel conversion, therefore, it is desired that the difference in density levels be made smaller in a low-density area than in a high-density area.

More specifically, let $\Delta OD$ (max,high) represent the maximum value of a difference in neighboring density levels in a high-density area, and let $\Delta OD$ (max, low) represent the minimum value of a difference in neighboring density levels in a low-density area. It is desired that the following relation be established:

$$\Delta OD(\text{max,high}) \geq 2 \cdot \Delta OD(\text{max,low})$$

Since the visual recognition rate is high in a low-density area, it is desired that the difference in density levels be substantially constant. The reason for this is that if there is a variation in density level difference in this area, the density level difference in such a portion is readily recognized as a decline in image quality.

In order to achieve the present invention, the density of ink dots used in this invention is as follows:

When one pixel is formed from a maximum of m-number of ink dots of inks of the same color and one is the maximum number of ink dots of the same density for this pixel, it is desired that the relation $$D1:D2:\ldots:Dm=1:2:\ldots:2^{m-1}$$

be established, where the individual densities of the ink dots of different densities of the same color are represented by $D1, D2, \ldots, Dm, \ldots, Dn$ from the side of low density.

Further, in a case where one pixel is formed from a maximum of two ink dots of the same density, it is desirable to so arrange it that combinations in accordance with a density ratio $1:2:\ldots:2^{m-1}$ be formed from among individual densities or densities which are the sums of the densities of two dots, namely $D1, D2, \ldots, Dm, D1+D1, D1+D2, \ldots, D1+Dm, \ldots, Dm+Dm$ from among m-number of ink dots on the low-density side. As a result, it will be possible to establish density levels at substantially regular intervals in the low-density area.

According to another aspect of the present invention, the foregoing object is attained by providing a recording apparatus for recording a grayscale image on a recording medium based upon input image data, comprising: transport means for transporting the recording medium; first recording means, which has two or more types of recording agents of different densities but of the same color, for performing recording by being scanned in a direction perpendicular to a direction in which the recording medium is transported; second recording means, which is situated at a position different from a position at which the first recording means is situated and has two or more types of recording agents of different densities but of the same color, for performing recording by being scanned in the direction perpendicular to the direction in which the recording medium is transported; decision means deciding a combination of the recording agents used to record a pixel of the grayscale image that is to be recorded on the recording medium, wherein one or more of the recording agents possessed by each of said first and second recording means is included in the combination, the decision being based upon said pixel; and control means for controlling transport by the transport means and recording by the first recording means or by the first and second recording means based upon the input image data and the combination of recording agents decided by the decision means.

According to the present invention, the foregoing object is attained by providing a method of controlling a recording apparatus for recording a grayscale image on a recording medium based upon input image data, comprising: a recording step of performing recording on the recording medium using recording means having three or more types of recording agents of different densities but of the same color; a decision step of deciding a combination of the types of recording agents used to record a pixel of the grayscale image that is to be recorded on the recording medium, the combination being decided based upon the pixel; and a control step of controlling recording by the recording step based upon the input image data and the combination of recording agents decided by the decision step.

According to another aspect of the present invention, the foregoing object is attained by providing a method of controlling a recording apparatus for recording a grayscale image on a recording medium based upon input image data, comprising: a transport step of transporting the recording medium; a first recording step of performing recording by scanning first recording means, which has two or more types recording agents of different densities but of the same color, in a direction perpendicular to a direction in which the recording medium is transported; a second recording step of performing recording by scanning second recording means, which is situated at a position different from a position at which the first recording means is situated and has two or more types of recording agents of different densities but of the same color, in the direction perpendicular to the direction in which the recording medium is transported; a decision step of deciding a combination of the recording agents used to record a pixel of the grayscale image that is to be recorded on the recording medium, wherein one or more of the recording agents possessed by each of the first and second recording means is included in the combination, the decision being based upon the pixel; and a control step of controlling transport by the transport step and recording by the first recording step or by the first and second recording steps based upon the input image data and the combination of recording agents decided by the decision step.

Thus, in accordance with the present invention, as described above, it is possible to provide a recording apparatus capable of recording an excellent grayscale image without a major increase in cost, as well as a method of controlling this apparatus.

According to the present invention, the foregoing objects are attained by providing recording apparatus for forming a glayscale image on a recording medium by jetting at least three types of inks of different densities but of same color from recording heads provided for corresponding ones of the types of inks, wherein a ratio $D1: \ldots :Dn$ of the density values of a recorded image obtained in a case where each of the inks are jetted onto the recording medium satisfies at least the first condition $Di-1<Di \leq 2 \cdot Di-1$ and Di is approximately a whole-number multiple of D1, $2<i \leq n$, i: positive integer;

said apparatus comprising:

wherein the inks used are such that the sum of density values of recorded images formed by each of the inks is approximately equal to the density value of a recorded image obtained in a case where the image is recorded by superposing the inks, and the ratio $D1: \ldots :Dn$ of the density values satisfies the condition where the first condition and the second condition $Dj-1<Dj<2 \cdot Dj-1$ (j: positive integer) are combined;

setting means for setting a ratio of density values of the recorded image; and control means for controlling a combination of inks jetted from each of the recording heads on the basis of the ratio of densities set by said setting means;

wherein the first condition and the second condition are combined such that differences of optical densities between the images recorded in each of the consecutive number of tones are substantially equal.

According to the present invention, the foregoing objects are attained by providing a method of controlling a recording apparatus for forming a glayscale image on a recording medium by jetting at least three types of inks of different densities but of same color from recording heads provided for corresponding ones of the types of inks, wherein a ratio $D1: \ldots :Dn$ of the density values of a recorded image obtained in a case where each of the inks are jetted onto the recording medium satisfies at least the first condition $Di-1<Di \leq 2 \cdot Di-1$ and Di is approximately a whole-number multiple of D1, $2<i \leq n$, i: positive integer;

said apparatus comprising:

wherein the inks used are such that the sum of density values of recorded images formed by each of the inks is approximately equal to the density value of a recorded image obtained in a case where the image is recorded by superposing the inks, and the ratio $D1: \ldots :Dn$ of the density values satisfies the condition where the first condition and the second condition $Dj-1<Dj<2 \cdot Dj-1$ (j: positive integer) are combined;

a setting step of setting a ratio of density values of the recorded image; and a control step of controlling a combination of inks jetted from each of the recording heads on the basis of the ratio of densities set by said setting means;

wherein the first condition and the second condition are combined such that differences of optical densities between the images recorded in each of the consecutive number of tones are substantially equal.

According to the present invention, the foregoing objects are attained by providing recording apparatus for for forming a image on a recording medium by jetting at least three types of inks of different densities but of same color from recording heads provided for corresponding ones of the types of inks, said apparatus comprising:

recording control mans for controlling forming of a glayscale image such that a number of ink dots m printed in one pixel is smaller than number of ink types n in all number of tones.

According to the present invention, the foregoing objects are attained by providing a method of controlling a recording apparatus for forming a image on a recording medium by jetting at least three types of inks of different densities but of same color from recording heads provided for corresponding ones of the types of inks, said method comprising:

a recording control step of controlling forming of a glayscale image such that a number of ink dots m printed in one pixel is smaller than number of ink types n in all number of tones.

Thus, in order to express the maximum number of tones using the minimum number of types of ink in a printer having recording heads capable of printing inks of a plurality of different densities in superposed fashion, inks are printed a plurality of times in superposition on the same pixel. By printing n types of inks a plurality of times in superposition on the same pixel where the density ratio (which expresses the relative densities) of the inks is $D1: \ldots :Dn=1: \ldots :2^{(n-1)}$, the maximum number of tones can be expressed without any densities being excluded and without any decline in the resolution of the recorded image.

[One Requirement: "Additivity"]

In a case where ink-jet technology is employed to perform recording on a transparent film used when recording a transparency image, optical density adds up when ink is jetted onto the film a plurality of times in superposition for one and the same pixel. If the ink/film system has this property, it can be said to exhibit "additivity".

One example in which the additivity requirement is met is as follows: If a 2% solution of the dye C.I. Direct Black 19 is recorded uniformly on BJ transparency film CF-301 (Canon K.K.) serving as a sheet of the recording medium, the image obtained will having a optical density of 0.8 D. If 1% solution of C.I. Direct Black 19 is recorded uniformly on this film, the image obtained will having a optical density of 0.4 D. If the inks having these two different densities are superposed on the same pixel to record an image on the film, a optical density of 1.2 D can be obtained. It has been confirmed by experimentation that additivity is achieved over a broad range of 0 to 2.5 D with this ink/film system.

By printing a plurality of inks of different densities in superposition on the same pixel in such an ink/film system that exhibits additivity, the number of tones capable of being expressed can be increased greatly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing ink-related data which includes ink density data and combination data according to the first embodiment;

FIG. 13 is a diagram showing ink-related data which includes ink density data and combination data according to the second embodiment;

FIG. 15 is a diagram showing ink-related data which includes ink density data and combination data according to a second example for purposes of comparison.

FIG. 23 is a diagram showing an image density signal distribution table according to a fourth embodiment;

FIG. 24 is a diagram showing an image density signal distribution table according to a fifth embodiment;

FIG. 25A is a diagram showing an image density signal distribution table according to a sixth embodiment;

FIG. 25B is a diagram showing an image density signal distribution table according to the sixth embodiment;

FIG. 26 is a diagram showing an image density signal distribution table according to a seventh embodiment;

FIG. 27A is a diagram showing an image density signal distribution table according to an eighth embodiment;

FIG. 27B is a diagram showing the image density signal distribution table according to the eighth embodiment;

FIG. 27C is a diagram showing the image density signal distribution table according to the eighth embodiment;

FIG. 28A is a diagram showing an image density signal distribution table according to a ninth embodiment; and FIG. 28B is a diagram showing an image density signal distribution table according to the ninth embodiment.

DESCRIPTION OF THE PREFERRED EMBODIMENTS

Figure 1:
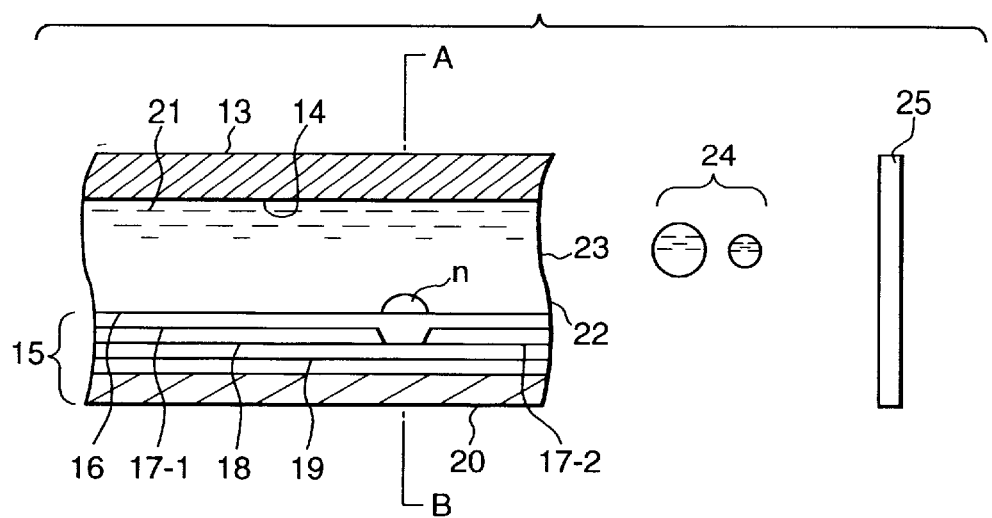
FIG. 1 is a diagram showing an example of the construction of a head, which is a principal part of an ink-jet recording apparatus according to a first embodiment of the present invention.

Preferred embodiments of the present invention will now be described in detail with reference to the drawings.

[First Embodiment]

The general principles of the present invention will described first.

According to the present invention, it is so arranged that each pixel can be expressed by a number of tones (gray levels) that is greater than the number of types of ink used, multilevel conversion processing is executed based upon the number of gray levels and grayscale recording is performed. More specifically, if there are n types of ink, each pixel is formed by selecting any of the one through n types of ink at will, whereby m levels (m>n+1) are obtained for each pixel. In other words, the number of tones or gray levels of each pixel is increased over the original number. A grayscale image is output by executing multilevel conversion processing based upon the number of gray levels of each pixel, which processing is in accordance with an m-level error diffusion method, m-level average density preservation method, m-level dither matrix method or sub-matrix method.

Combinations of n types of ink include n combinations which select one ink from the n types of ink, nC2 combinations which select two inks from the n types, nC3 combinations which select three inks from the n types, . . . , nCn combinations which select n inks from the n types, and one ink-less combination. The conversion to m levels is performed by selecting and using m types of combinations which provide appropriate densities from among these combinations. When m types of combinations are selected, the combinations are decided in such a manner that the difference in density levels becomes smaller the lower the density of the region.

In a case where an increase in recording speed is taken into account, two recording heads may be provided each having identical types of ink. In such case ink having the same density can be printed twice for one pixel. Even if the same n types of ink are used in each of the two recording heads, it is possible to express more densities in comparison with the example described above. For example, combinations which select two inks from n types of ink are nC2+nC1, and combinations which select three inks from n types of ink are nC3+nC1×n−1C1. Here m types of combinations which provide appropriate densities are selected from among these combinations.

Furthermore, consider a case where amount of ink absorbed by the recording medium is taken into account. If inks of many types are jetted for one and the same pixel, a situation may arise in which the recording medium is no longer capable of absorbing the ink. The result is excess ink or "ink overflow". Though the ink overflow phenomenon depends largely upon the physical properties of the ink and recording medium, the problem is solved in general preferably by making the number of inks jetted for the same pixel no greater than six.

By way of example, assume that the number of inks jetted for the same pixel is four and that ink of the same density is printed only once for the same pixel. There will be n combinations which select one ink from the n types of ink, nC2 combinations which select two inks from the n types, nC4 combinations which select three inks from the n types, and one ink-less combination. It is preferred here that the appropriate m combinations be selected from the n+nC2+nC3+nC4+1 combinations.

Now assume that ink of the same density is printed twice for the same pixel. There will be n combinations which select one ink from the n types of ink, nC2+nC1 combinations which select two inks from the n types, nC3+nC1×n−1C1 combinations which select three inks from the n types, nC4+nC1×n−1C2+nC2 combinations which select four inks from the n types, and one ink-less combination. It is preferred here that the appropriate m combinations be selected from the n+nC2+nC1+nC3+nC1×n−1C1+nC4+nC1×n−1C2+nC2+1 combinations.

Furthermore, though the number of gray levels for effecting the conversion to multiple levels is related to the resolution of the output image, at least ten gray levels will be effective in that the dots formed on the recording medium will not be conspicuous.

The construction of an ink-jet recording apparatus which performs recording by the ink-jet technique will be described as the first embodiment of the present invention with reference to FIGS. 1 through 4.

The ink-jet method of recording according to the present invention is applicable to any of the well-known prior-art ink-jet recording systems which utilize perform recording by discharging small drops of ink from nozzles utilizing various driving principles. A typical example is the method described in the specification of Japanese Patent Application Laid-Open No. 54-59936. According to this disclosed ink-jet system, ink that has been acted upon by thermal energy undergoes a sudden change in volume and the ink is jetted from nozzles by being acted upon by a force resulting from this change in state.

Figure 2:
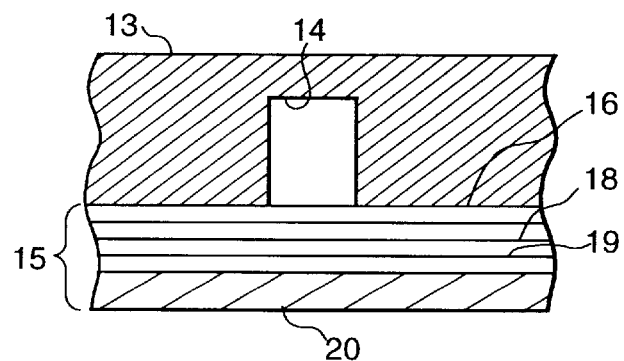
FIG. 2 is a diagram showing an example of the construction of a head, which is a principal part of an ink-jet recording apparatus according to the first embodiment of the present invention.
Figure 3:
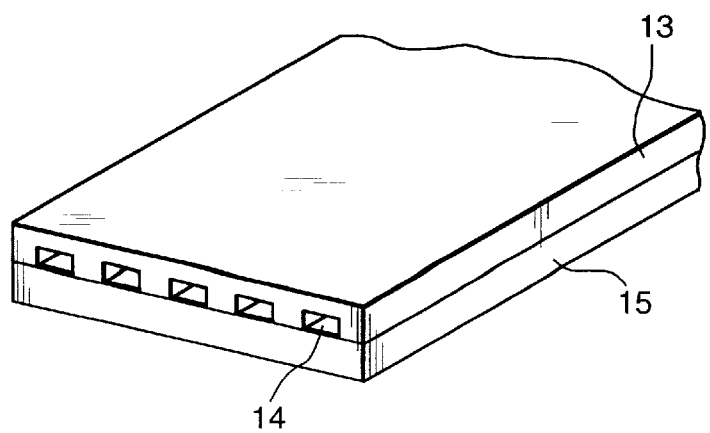
FIG. 3 is a diagram showing an example of the construction of a head, which is a principal part of an ink-jet recording apparatus according to the first embodiment of the present invention.

FIGS. 1 through 3 are diagrams illustrating an example of the construction of a head 13, which is a principal part of the ink-jet recording apparatus according to a first embodiment of the present invention.

The head 13 is obtained by bonding a glass, ceramic or plastic plate, which has channels 14 through which ink is passed, to a heating head 15 used in thermosensitive recording. (The head 15 is not limited to that of the type illustrated.) The heating head 15 comprises a protective film 16 formed of silicon oxide or the like, aluminum electrodes 17-1, 17-2, a heating resistor layer 18 formed of nichrome or the like, a heat storage layer 19 and a substrate 20 exhibiting an excellent heat diffusing property, e.g., a substrate consisting of alumina or the like.

Ink 21 reaches a discharge orifice 22 and forms a meniscus 23 owing to applied pressure P.

When an electric signal is applied to the aluminum electrodes 17-1, 17-2, the area of the heating head 15 indicated by n suddenly produces heat which causes a bubble to form in the ink 21 in contact with this area. The meniscus 23 is caused to bulge by the pressure of the air bubble, producing a discharge of the ink 21 that forms recording droplets 24 from the orifice 22. The droplets 24 fly toward a recording medium 25. FIG. 3 is an external perspective view of a multihead (recording head) in which a number of the heads illustrated in FIG. 1 are arranged in a row. The multihead is fabricated by bonding the head 13, which has a plurality of the channels 14, to the heating head 15 described in connection with FIG. 1.

FIG. 2 is a sectional view of the head 13 taken across the ink channels, namely along line A–B in FIG. 1.

The construction of the recording head used in this invention is the same as that of a recording head used generally in the conventional ink-jet recording apparatus.

An example of an ink-jet recording apparatus in which the above-mentioned recording head has been mounted will be described with reference to FIG. 4.

Figure 4:
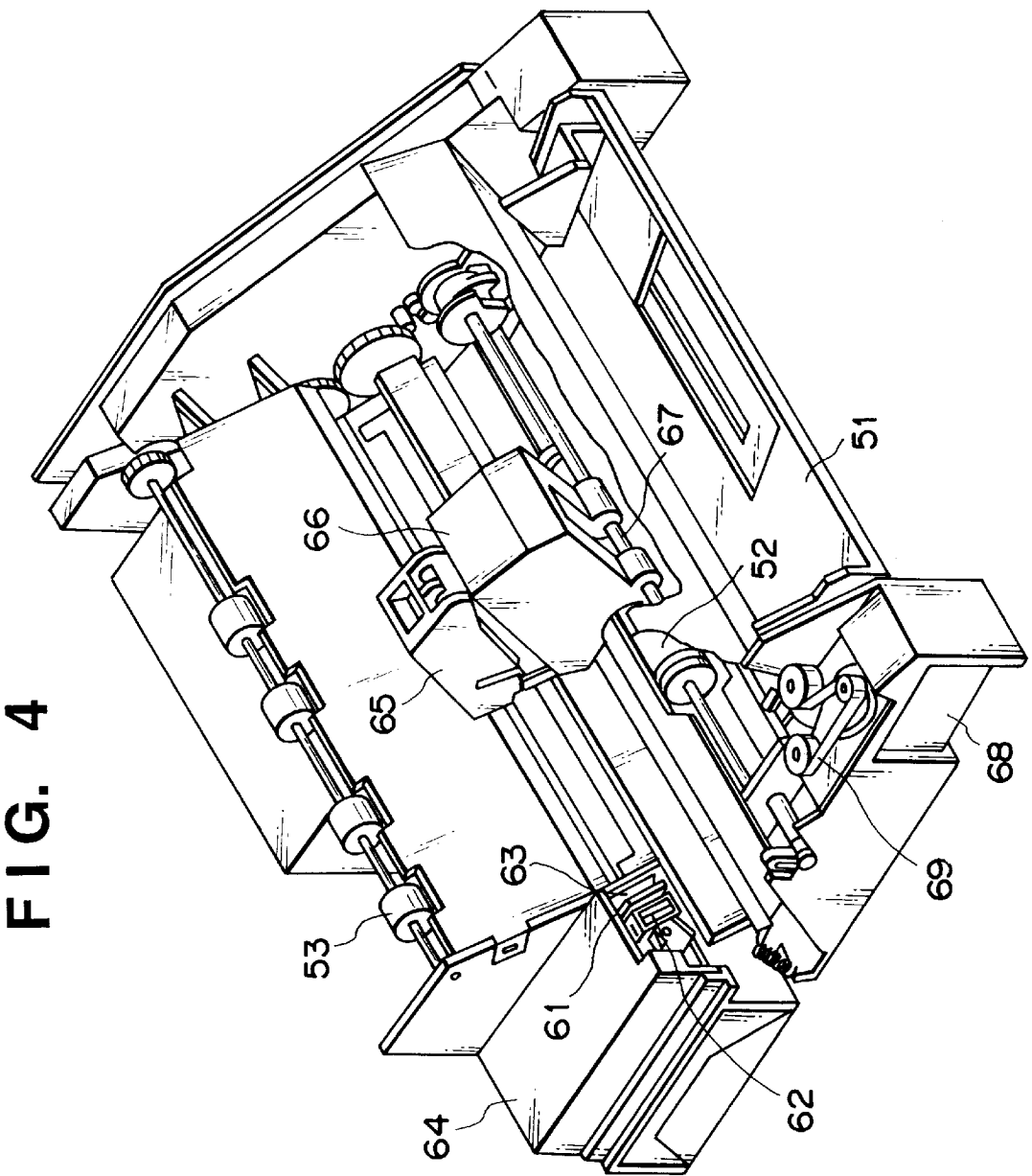
FIG. 4 is a perspective view showing an example of an ink-jet recording apparatus according to the first embodiment of the present invention.

As shown in FIG. 4, the recording apparatus includes a blade 61 serving as a wiping member. One end of the blade 61 is fixed and is held by a blade holding member in such a manner that the blade is cantilevered. The blade 61 is placed at a location neighboring an area in which recording is performed by a recording head 65, described below. In this invention, the blade 61 is held so as to project into the traveling path of the recording head 65. A cap 62 is placed at a home position, which is adjacent the blade 61, and performs a capping operation by being moved in a direction perpendicular to the traveling direction of the recording head 65 so as to abut against the surface of the ink discharge ports of the head. An ink absorbing body 63, which is provided adjacent the blade 61, is held so as to project into the traveling path of the recording head in the same manner as the blade 61. The blade 61, cap 62 and ink absorbing body 63 construct an ink discharge recovery unit 64, in which moisture, dust and the like are removed from the surface of the ink discharge ports by the blade 61 and ink absorbing body 63.

The recording head 65 has jetting energy generating means and performs recording by jetting ink toward the recording medium opposing the surface of the ink discharge ports. The recording head 65 is constituted by one multihead group having multiheads the number of which is the same as the number of toned pigment inks used. The recording head 65 is mounted on a carriage 66, which is for moving the recording head 65. The carriage 66 is slidingly engaged with a guide 67, and part of the carriage 66 is connected to a belt 69 driven by a motor 68. The connection is not shown. As a result, the carriage 66 is capable of being moved along the guide 67 and it is possible to move the recording area of the recording head 65 as well as the area adjacent thereto. The recording head 65 is equipped with a plurality of ink cartridge groups (not shown) for supplying inks of a plurality of types.

The apparatus further includes a paper feed unit 51 for inserting the recording medium, and a paper feed roller 52 driven by a motor, which is not shown. These components cooperate to feed the recording medium to a position confronting the surface of the ink discharge ports of the recording head 65. As recording proceeds, the recording medium is discharged toward a discharge section having paper discharge rollers 53.

When the recording head 65 in the above-described arrangement returns to the home position as at the end of recording, the cap 62 of the ink discharge recovery unit 62 is retracted from the traveling path of the recording head 65 but the blade 61 is projecting into the traveling path. As a result, the surface of the ink discharge ports of the recording head 65 is wiped. In a case where capping is performed by bringing the cap 62 into abutting contact with the surface of the ink discharge ports of the recording head 65, the cap 62 is moved so as to be projected into the traveling path of the recording head 65.

When the recording head 65 is moved from the home position to the recording starting point, the cap 62 and blade 61 are located at positions the same as those occupied at the time of the wiping operation. As a result, the surface of the ink discharge ports of the recording head 65 is wiped by this movement of the head as well.

The movement of the recording head to the home position is performed not only at the end of recording or when the ink discharge recovery operation is performed. That is, the recording head 65 is moved to the home position, which neighbors the recording area, also at prescribed intervals while the recording area for the recording operation is moved. This movement is accompanied by the above-mentioned wiping operation.

According to this invention, recording heads 65 comprising multihead groups conforming to the number of types of toned pigment ink are arranged in a row on the carriage 66. However, a configuration may be adopted in which, instead of disposing the multihead groups constituting the recording head in a row, a single recording head 65 is split into vertical rows in dependence upon the number of types of toned pigment ink and these vertical sections are arrayed along the carriage.

Further, in case of color printing, four recording heads comprising multihead groups holding toned pigment inks of the respective colors black, cyan, magenta and yellow are arranged in a row on the carriage 66. However, an arrangement may be adopted in which, instead of disposing the recording heads side by side, a single recording head is split into four vertical rows. Furthermore, three inks of the colors cyan, magenta and yellow may be used instead of inks of four colors.

A control arrangement for executing recording control of the ink-jet recording apparatus set forth above will now be described with reference to FIG. 5.

Figure 5:
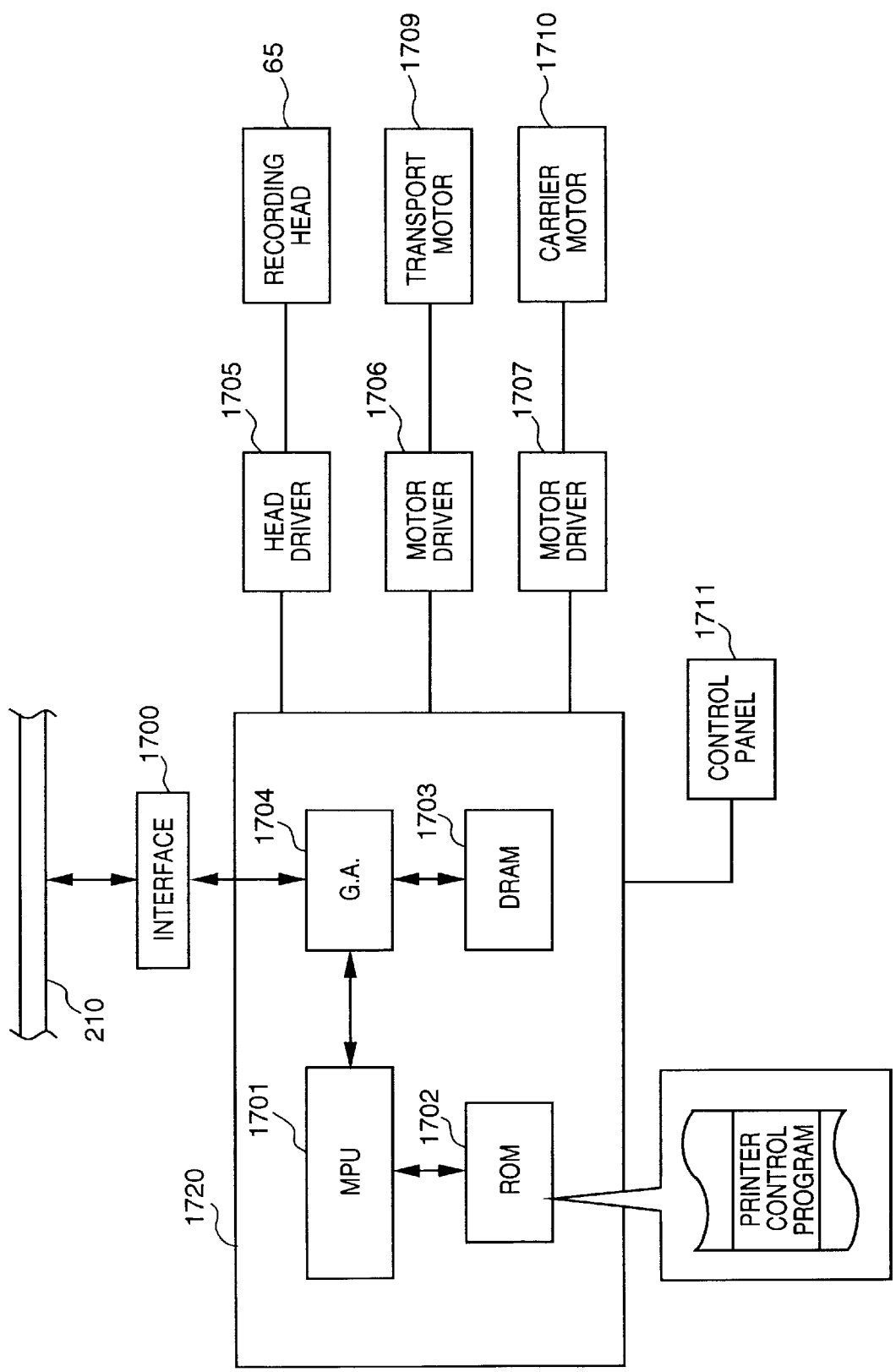
FIG. 5 is a block diagram showing a control circuit in the ink-jet recording apparatus according to the first embodiment of the present invention.

FIG. 5 is a block diagram showing a control circuit in the ink-jet recording apparatus according to the first embodiment of the present invention.

As shown in FIG. 5, the control circuit includes an interface 1700 for entering a recording signal from a data transmission line 210, an MPU 1701, a ROM 1702 storing a printer control program executed by the MPU 1701, a DRAM 1703 in which various data (the above-mentioned recording signal and recording data supplied to the recording head 65, etc.) is saved in advance, and a gate array (G.A.) 1704 for controlling supply of recording data to the recording head 65 as well as transfer of data among the interface 1700, MPU 1701 and RAM 1703. The blocks 1701, 1702, 1703 and 1704 construct a controller 1720.

A carrier motor 1710 transports the recording head 65 and a transport motor 1709 transports the recording medium. A head driver 1705 drives the recording head 65. Motor drivers 1706 and 1707 are for driving the transport motor 1709 and carrier motor 1710, respectively. A control panel 1711 has keys for performing various setting and registration operations, a liquid crystal display for displaying messages and LED lamps which indicate the status of the apparatus.

In terms of operation, the recording signal enters the interface 1700 from a host computer via the data transmission line 210, whereupon the gate array 1704 and MPU 1701 cooperate to convert the recording signal to recording data for printing. The motor drivers 1706, 1707 are driven into operation and the recording head 65 is driven in accordance with the recording data sent to the head driver 1705, as a result of which recording is performed.

It should be noted that the MPU 1701 is capable of executing processing for communicating with the host computer via the interface 1700. It is so arranged that memory information relating to the DRAM 1703 and resource data, as well as host computer recording information stored in the ROM, can be communicated to the host computer. This data and information can be communicated to the host computer even if ink in the ink tank supplying ink to the recording head 65 runs out or even if the recording head 65 or motors malfunction.

Described next as an example is a case in which six types toned pigment inks for the color black are used, a maximum of four ink dots are discharged for one pixel and a monochrome 256-tone X-ray transparency image for medical purpose is obtained as an output. It is generally said that the number of tones of an image for medical purposes printed in 300-dpi requires ten or more tones, preferably sixteen or more tones, more preferably sixty-four or more tones, more preferably two-hundred-fifty-six or more tones.

The functional construction of recording control in the ink-jet recording apparatus according to the first embodiment will be described with reference to FIG. 6.

Figure 6:
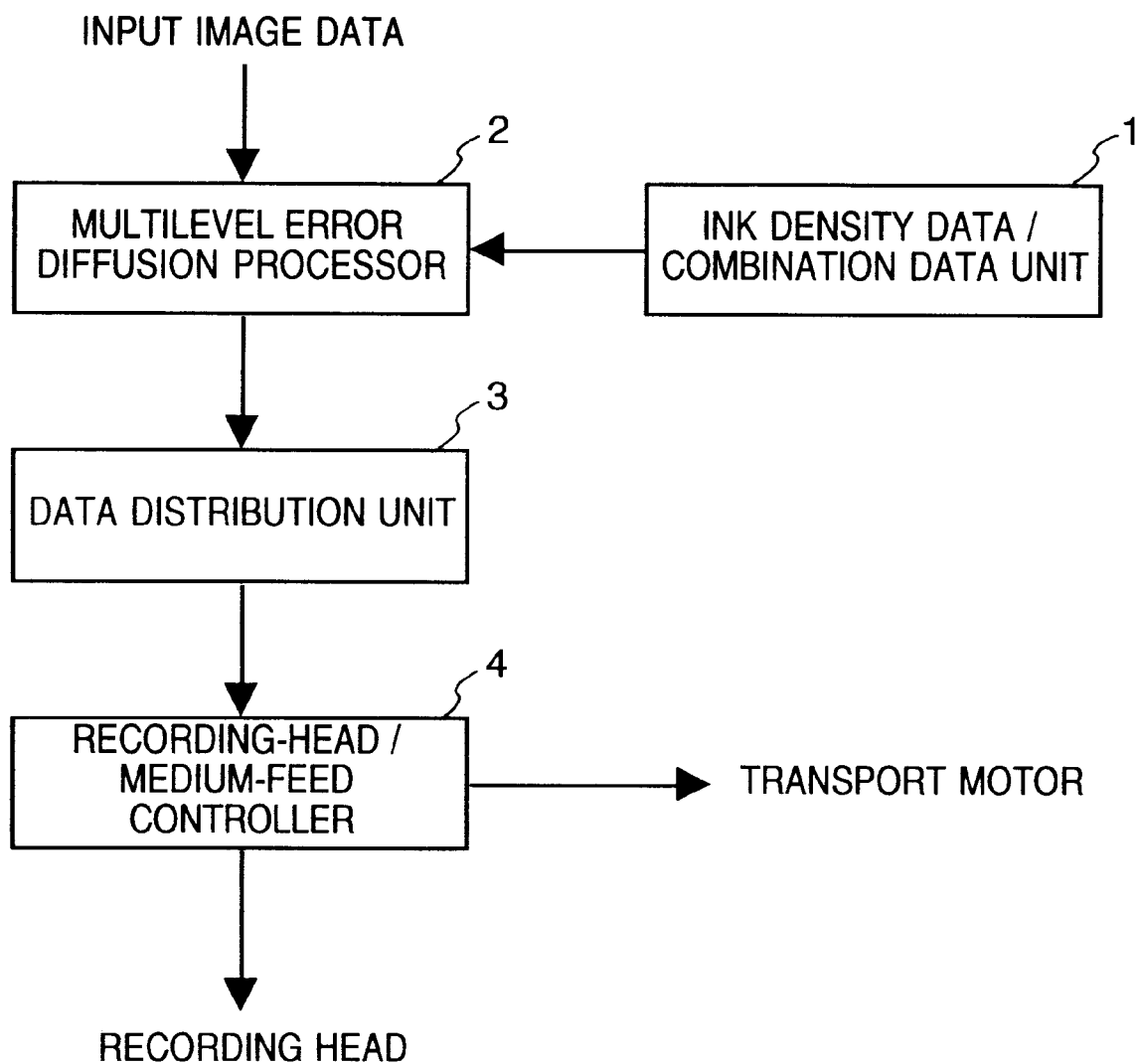
FIG. 6 is a block diagram showing the functional construction of recording control in the ink-jet recording apparatus according to the first embodiment of the present invention.

FIG. 6 is a block diagram showing the functional construction of recording control in the ink-jet recording apparatus according to the first embodiment of the present invention.

Figure 8:
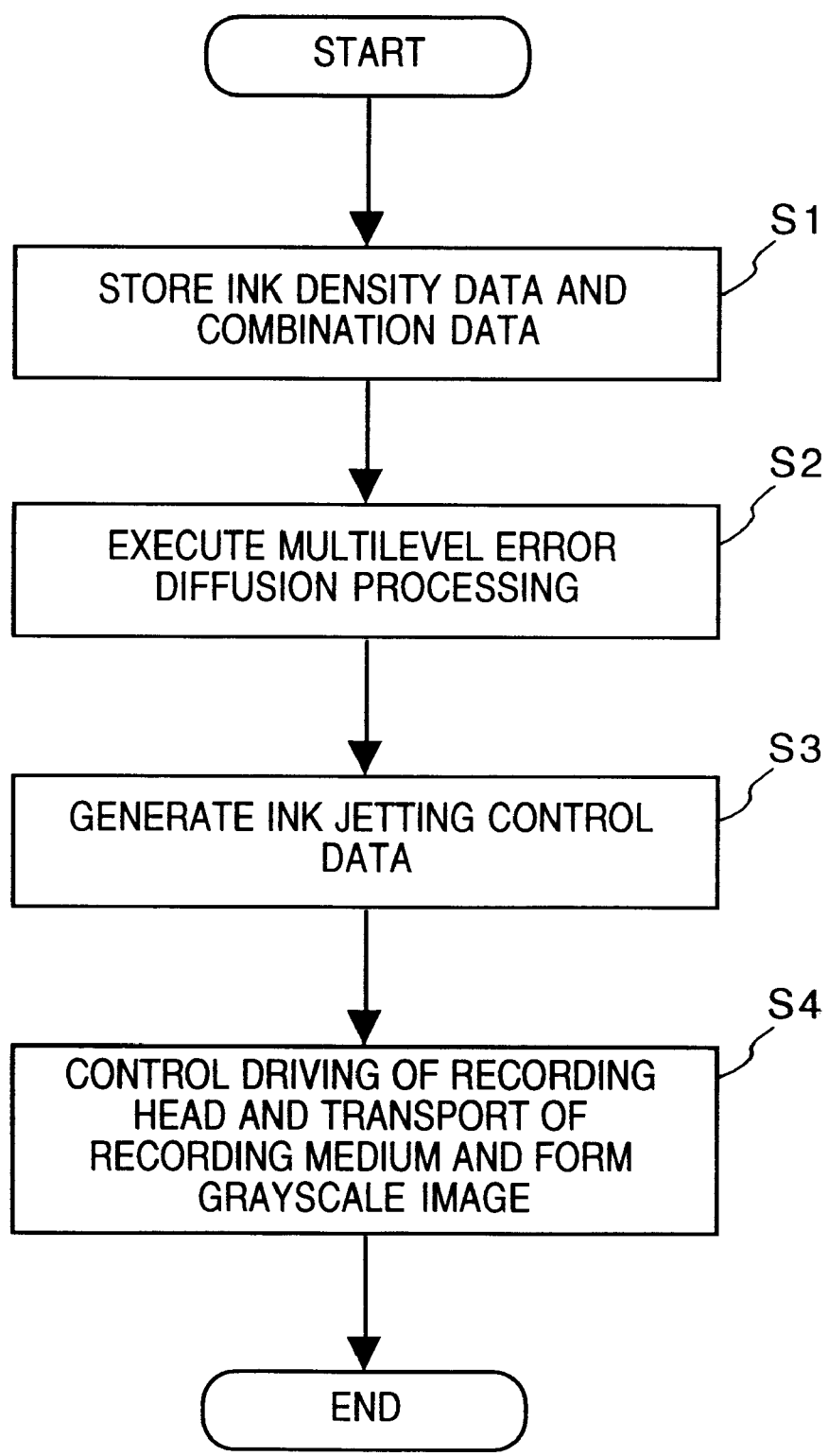
FIG. 8 is a flowchart illustrating a procedure for controlling the ink-jet recording apparatus according to the first embodiment of the present invention.

According to the first embodiment, the functional arrangement described below is assumed to be implemented by processing executed by the MPU 1701. However, implementation can be by special-purpose hardware provided within the controller 1720. Further, it may be so arranged that the processing of the kind shown in FIG. 8 is executed in the host computer, multilevel data is produced and the data is transmitted to the ink-jet recording apparatus.

Shown in FIG. 6 is an ink density data/combination data unit 1. The unit 1 stores combination data, which indicates a combination of ink types (six types of ink are employed in the first embodiment) used in the recording head 65, as well as ink density data prevailing at such time. The ink density data/combination data unit 1 is formed in the DRAM 1703. A multilevel error diffusion processor 2 subjects input image data (of 256 tones) to multilevel error diffusion processing based upon the ink density data that has been accumulated in the ink density data/combination data unit 1. In the first embodiment, a case in which the input image data is converted to 53-level image data is described as an example. However, desired multilevel error diffusion processing can be executed in conformity with the number of tones capable of being expressed by the ink-jet recording apparatus. The details of multilevel error diffusion processing will be described later with reference to the flowchart of FIG. 8.

A data distribution unit 3 generates ink jetting control data, which indicates the type of ink to be distributed to the recording head 65, based upon the results of processing executed by the multilevel error diffusion processor 2. A recording-head/medium-feed controller 4 controls the drive of the recording head 65 and the transport of the recording medium based upon ink jetting control data produced by the data distribution unit 3.

The inks used in the recording head 65 of the first embodiment are indicated in Table 1 below. Six types of ink are used, as indicated in the table, and are designated by A, B, C, D, E and F in order of decreasing density. The table also shows the pigment density (%) and optical density of each of the inks A through F. Each ink consists of a pigment and solvent, and the solvent contains various additives such as a surface-activate agent and a humectant. These additives control the jetting characteristic of ink jetted from the recording head as well as the absorption characteristic of the ink in regard to the recording medium.

TABLE 1

| TYPE | A | B | C | D | E | F |
|---|---|---|---|---|---|---|
| PIGMENT DENSITY | 3.88 | 2.00 | 1.00 | 0.50 | 0.25 | 0.125 |
| OPTICAL DENSITY | 1.72 | 0.89 | 0.44 | 0.22 | 0.11 | 0.06 |

In a case where a maximum of four types of these six types of ink are printed for one and the same pixel, the number of tones capable of being expressed by one pixel is 6+6C2+6C3+6C4+1=57. It should be noted that the inks in Table 1 have such pigment densities that combinations giving identical densities cannot be formed. The ratio of individual densities of four types of ink dots on the low density side in this case is 1:2:4:8 from the low density side. In the first embodiment, 53 of these 57 tones are used to produce an output image. In other words, the input image data (of 256 tones) is made 53-tone data to obtain the output image. The types of ink and the combinations thereof for expressing each of these 53 tones are illustrated in FIG. 7. The "No." column in FIG. 7 indicates each of the tones. The asterisks (*) indicate combinations not used in order to so arrange it that a difference in density level in a low-density portion will be small in comparison with a high-density portion. In the columns "INK A" through "INK F", a circle mark indicates discharge of that ink from the recording head 65 and an "x" mark indicates that that ink is not discharged from the recording head 65. The column "dl[i]" (where i is an integer of 0 to 52) indicates the ink density levels that express the respective tones. The column "th[i]" (where i is an integer of 0 to 52) indicates threshold values for deciding which of the 53 tones the input image data is to be made. A threshold value usually is determined as an ink density level at the midpoint between an ink density level of dl[k−1] and an ink density level of dl[k].

Combinations of types of ink that indicate each of the tones make up the combination data, and the ink density levels decided based upon the combination data make up the ink density data.

In the first embodiment, the multilevel error diffusion processor 2 uses the 53 ink density levels (dl[0]~dl[52]) and the 52 threshold values (th[1]~th[52]) to execute multilevel error diffusion processing which converts the input image data (of 256 tones) to image data of 53 tones. The multilevel error diffusion processing of the first embodiment has a plurality (52 in this case) of threshold values for subjecting the input image data to the multilevel conversion. This is a major departure from ordinary error diffusion processing. Though the multilevel conversion of the input image data is carried out using multilevel error diffusion processing in this embodiment, this does not impose a limitation upon the invention. For example, the multilevel conversion of the input image data may be performed using multilevel average density preservation, a multilevel dither matrix, a submatrix or other method of multilevel conversion.

A procedure for controlling recording by the ink-jet recording apparatus of the first embodiment will be described with reference to the flowchart of FIG. 8.

FIG. 8 is a flowchart illustrating a procedure for controlling the ink-jet recording apparatus according to the first embodiment of the present invention.

Ink-related data used by the recording head 65, which data includes the ink density data and combination data, is stored in the ink density data/combination data unit 1 at step S1. This is followed by step S2, at which the input image data is entered and multilevel error diffusion processing is applied to each pixel indicated by this input image data.

Figure 9:
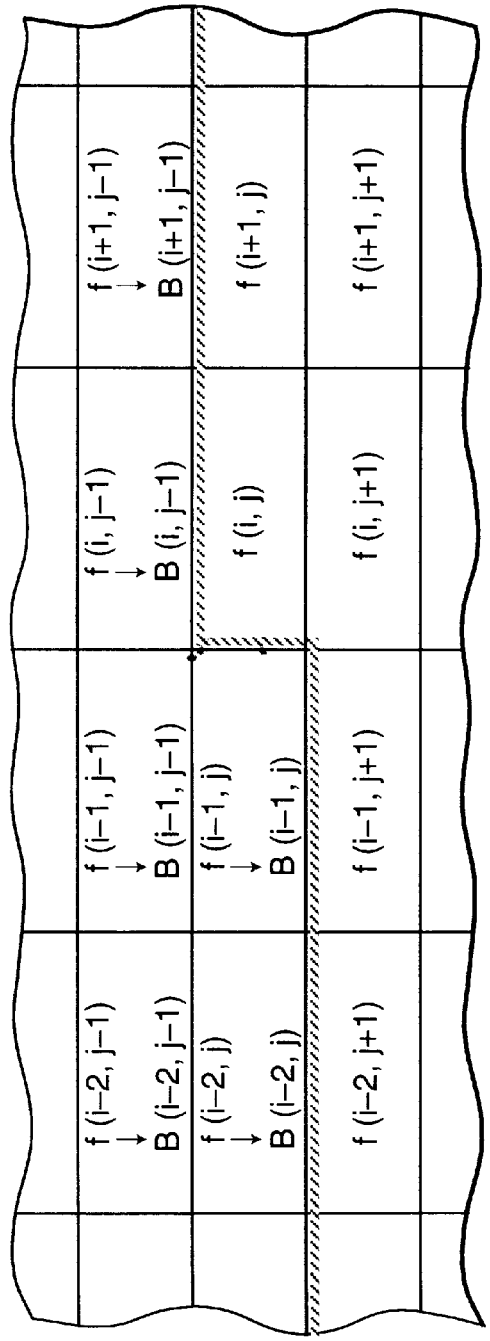
FIG. 9A is a diagram showing the disposition of input image data and 57-tone image data obtained by multilevel error diffusion processing according to the first embodiment.
FIG. 9B is an error diffusion matrix used in the first embodiment.

The details of this multilevel error diffusion processing will be described with reference to FIG. 9.

FIGS. 9A and 9B are views showing the disposition of input image data and 57-tone image data obtained by multilevel error diffusion processing according to the first embodiment. Specifically, FIGS. 9A and 9B show part of the disposition of pixels in density data [0 (black)~255 (transparent)] for each pixel indicated by the input image data.

In FIG. 9A, f(i,j) represents the density data level of a pixel of interest (i,j) to undergo the multilevel conversion (the conversion to 53 levels). Each of the pixels f(i−2,j−1) ~(i−1,j) above the broken line have already undergone the multilevel conversion (the conversion to 53 levels). Further, B(i,j) indicates density data (the 53 values "0", "8.6", ..., "250.7", 255") which results after the multilevel conversion (the conversion to 53 levels) is applied to the pixel of interest (i,j). After the multilevel conversion (the conversion to 53 levels) of the pixel of interest (i,j) is carried out, similar multilevel (53-level) conversion processing is executed sequentially in the order f(i,j+1), f(i,j+2), . . . .

First, the density data level f(i,j) of the pixel of interest (i,j) is compared with a threshold value th[k].

$$th[k] \le f(i, j) < th[k + 1] \quad (1)$$

$$B(i, j) = dI[k] \quad (2)$$

Next, the k which satisfies expression (1) is obtained and the density data B(i,j) that results after the pixel of interest (i,j) is converted to multiple (53) levels is decided from equation (2).

Next, by using an error diffusion matrix shown in FIG. 9B, an operation in accordance with equation (3) below is performed to calculate an error err produced between the density data B(i,j) decided by the above-described multilevel conversion processing and the 256-density data level f(i,j) prevailing prior to the multilevel conversion processing.

$$err = f(i,j) - dI[k] \quad (3)$$

The calculated error err is then diffused to other pixels in accordance with equation (4) below.

$$f'(x,y) = f(x,y) + err \times M(x-i, y-j) \div 31 \quad (4)$$

Thus, the error err is diffused to each pixel in accordance with the distribution indicated by the error diffusion matrix of FIG. 9B, after which multilevel (53-level) conversion processing is executed in similar fashion using the value f'(i,j) containing the diffused error.

Next, at step S3, the data distribution unit 3 generates the ink jetting control data, which controls the ink jetting operation of the recording head 65, based upon the above-mentioned combination data of FIG. 7 corresponding to the density data B(i,j) obtained by the multilevel (53-level) conversion processing. For example, if the density data B(i,j) is 64.8, then ink jetting control data is generated in such a manner that the recording head 65 will jet the inks A, C, D and F.

This is followed by step S4, at which the recording-head/medium-feed controller 4 controls the driving of recording head 65 and the transport of the recording medium in accordance with the ink jetting control data, whereby a grayscale image is formed.

In the first embodiment, six 300-dpi ink-jet heads (256-nozzle multiheads) are used to output a grayscale image (transparency) for medical purposes.

Thus, in accordance with the first embodiment, as described above, there is provided the recording head 65 capable of discharging plural types of light and dark inks in the direction in which the recording medium is transported (i.e., in the sub-scan direction). In the formation-of an image, recording is performed by discharging at least one pixel-forming ink dot. This makes it possible to increase the number of tones of a recorded image through an arrangement similar to that of the conventional recording head without newly fabricating a recording head capable of discharging many types of ink. In other words, an excellent grayscale image having a large number of tones can be obtained at least without making a large expenditure for the fabrication of a new recording head.

[Second Embodiment]

Described next as an example is a case in which two recording heads each capable of employing four types of black toned pigment inks are used, ink dots of identical density are discharged twice for one pixel and a monochrome 256-tone X-ray transparency image for medical purpose is obtained as an output.

An example of an ink-jet recording apparatus mounting two of the recording heads used in the first embodiment will be described with reference to FIG. 10.

Figure 10:
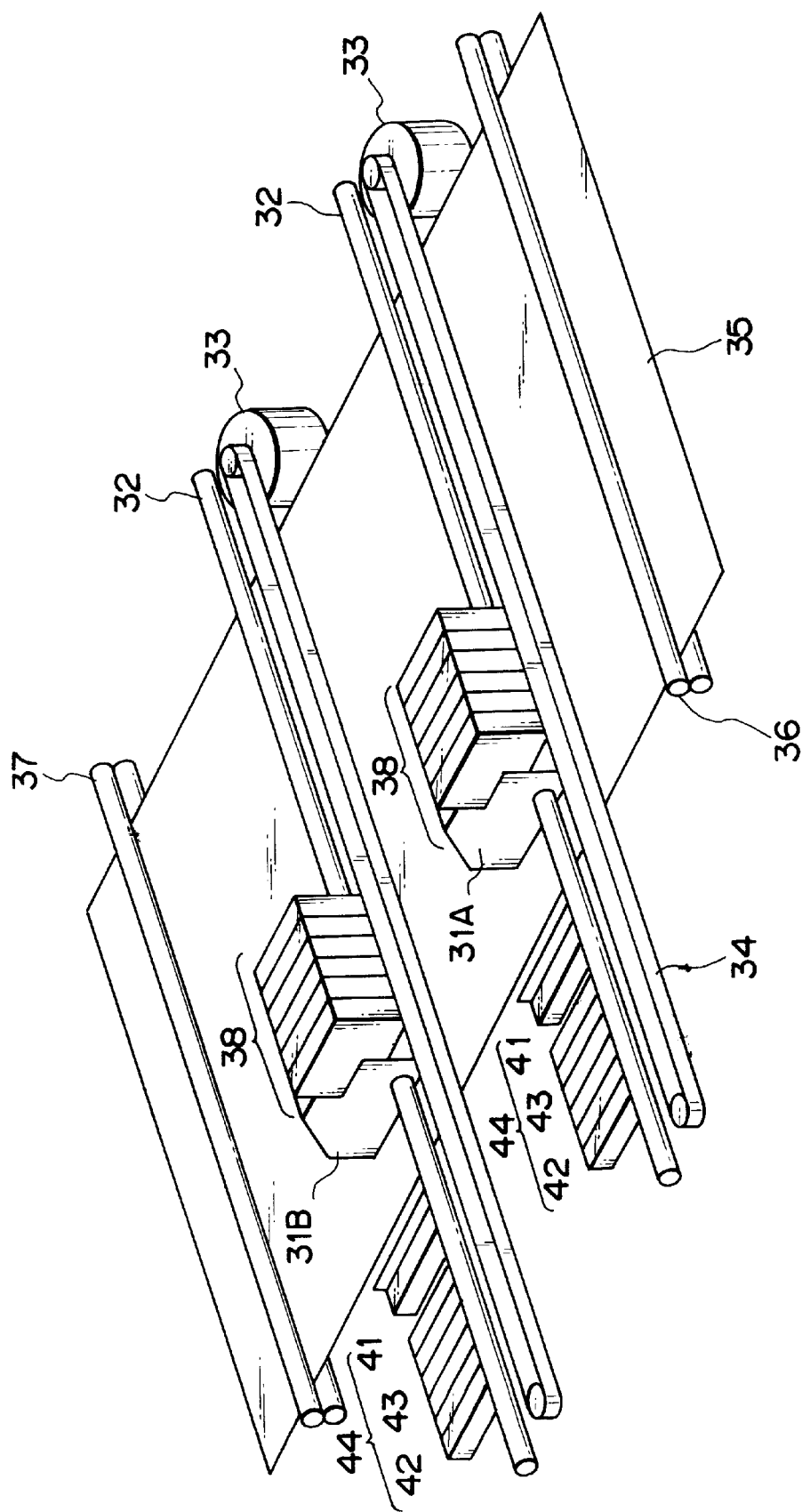
FIG. 10 is a perspective view showing an example of an ink-jet recording apparatus according to a second embodiment of the present invention.

FIG. 10 is a perspective view showing an example of an ink-jet recording apparatus according to a second embodiment of the present invention.

As shown in FIG. 10, the recording apparatus includes blades 41 serving as wiping members. One end of each blade 41 is fixed and is held by a blade holding member in such a manner that the blade is cantilevered. The blade 41 is placed at a location neighboring an area in which recording is performed by the corresponding recording head, described below. In this invention, the blade is held so as to project into the traveling path of the corresponding recording head. A cap 42 is placed at a home position, which is adjacent the blade 41, and performs a capping operation by being moved in a direction perpendicular to the traveling direction of the corresponding recording head so as to abut against the surface of the ink discharge ports of the head. An ink absorbing body 43, which is provided adjacent the blade 41, is held so as to project into the traveling path of the corresponding recording head in the same manner as the blade 41. The blade 41, cap 42 and ink absorbing body 43 construct an ink discharge recovery unit 44, in which moisture, dust and the like are removed from the surface of the ink discharge ports of the corresponding recording head by the blade 41 and ink absorbing body 43.

Recording heads 31A, 31B have jetting energy generating means and perform recording by jetting ink toward the recording medium opposing the surface of the ink discharge ports. Each of the recording heads 31A, 31B is constituted by one multihead group having multiheads the number of which is the same as the number of toned pigment inks used. The recording heads 31A, 31B are slidably engaged with respective guide shafts 32 and are connected to belts 34 driven by motors 33. The connections are not shown. As a result, the recording heads 31A, 31B are capable of being moved along the guide shafts 32 and it is possible to move the recording areas of the recording heads 31A, 31B as well as the areas adjacent thereto. Each of the recording heads 31A, 31B is equipped with a plurality of ink cartridge groups 38 for supplying inks of a plurality of types.

The apparatus further includes a paper feed unit 35 for inserting the recording medium, paper feed rollers 36 driven by a motor, which is not shown. These components cooperate to feed the recording medium to a position confronting the surface of the ink discharge ports of each of the recording heads 31A, 31B. As recording proceeds, the recording medium is discharged toward a discharge section having paper discharge rollers 37.

When the recording heads 31A, 31B in the above-described arrangement return to the home position as at the end of recording, the caps 42 of the ink discharge recovery units 44 are retracted from the traveling paths of the recording heads 31A, 31B but the blades 41 are projecting into the traveling paths. As a result, the surfaces of the ink discharge ports of the recording head 31A, 31B are wiped. In a case where capping is performed by bringing the caps 42 into abutting contact with the surfaces of the ink discharge ports of the recording heads 31A, 31B, the caps 42 are moved so as to be projected into the traveling paths of the recording heads 31A, 31B.

When the recording heads 65 are moved from the home position to the recording starting point, the caps 42 and blades 41 are located at positions the same as those occupied at the time of the wiping operation. As a result, the surfaces of the ink discharge ports of the recording heads 31A, 31B are wiped by this movement of the heads as well.

The movement of the recording heads 31A, 31B to the home position is performed not only at the end of recording or when the ink discharge recovery operation is performed. That is, the recording heads 31A, 31B are moved to the home position, which neighbors the recording area, also at prescribed intervals while the recording area for the recording operation is moved. This movement is accompanied by the above-mentioned wiping operation.

According to the present invention, the multihead groups in each of the recording heads 31A, 31B are arranged in a series with respect to the sub-scan direction. The two recording heads 31A, 31B need not perfectly synchronized. It will suffice if recording is performed while the recording medium is being transported in intermittent fashion.

Further, in case of color printing, four multihead groups holding toned pigment inks of the respective colors black, cyan, magenta and yellow are arranged in a row. Furthermore, three inks of the colors cyan, magenta and yellow may be used instead of inks of four colors.

A control arrangement for executing recording control of the ink-jet recording apparatus set forth above will now be described with reference to FIG. 11.

Figure 11:
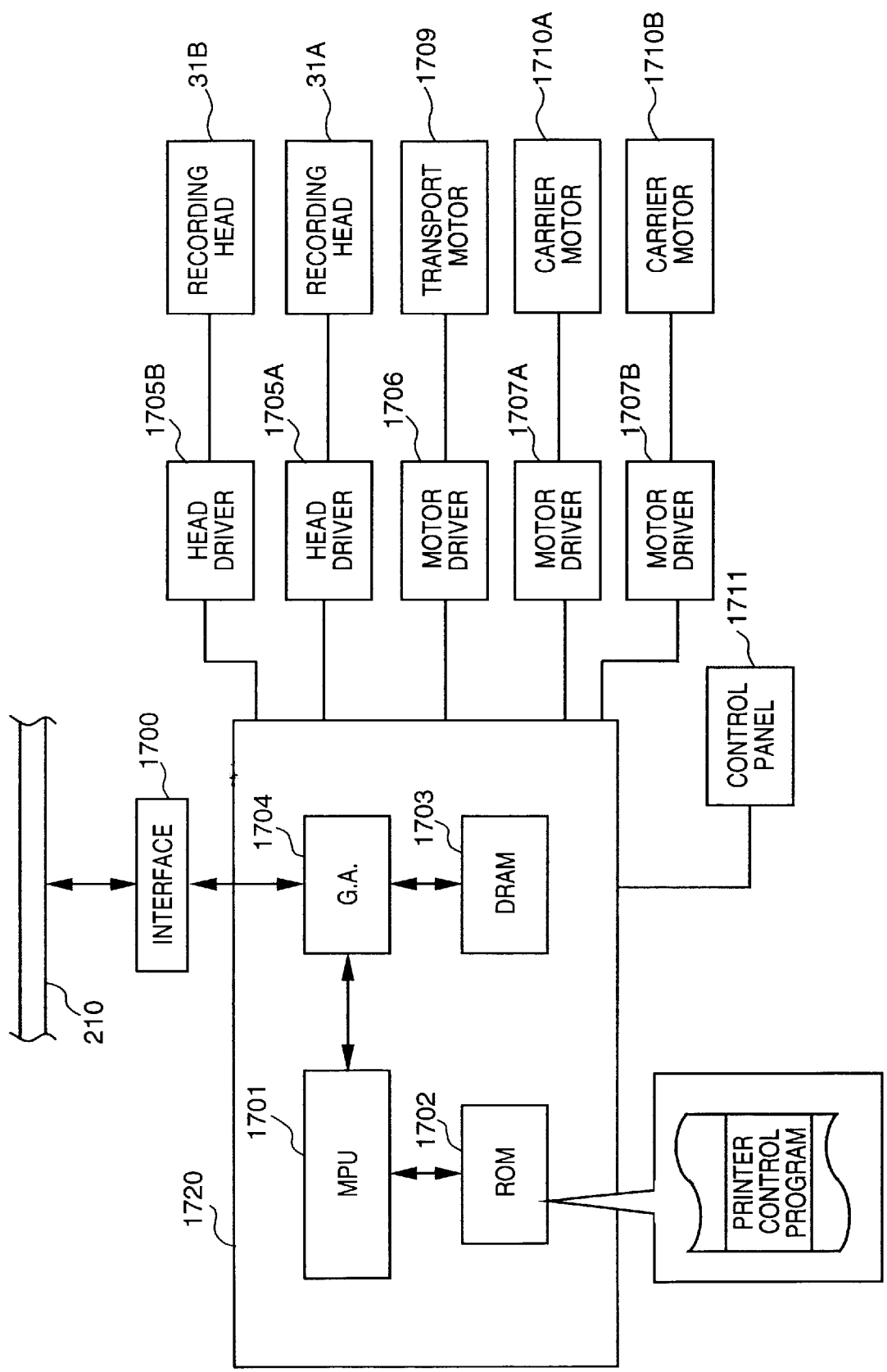
FIG. 11 is a block diagram showing a control circuit in the ink-jet recording apparatus according to the second embodiment of the present invention.

FIG. 11 is a block diagram showing a control circuit in the ink-jet recording apparatus according to the second embodiment of the present invention.

As shown in FIG. 11, the control circuit includes the interface 1700 for entering the recording signal from the data transmission line 210, the MPU 1701, the ROM 1702 storing the printer control program executed by the MPU 1701, the DRAM 1703 in which various data (the above-mentioned recording signal and recording data supplied to the recording heads 31A, 31B, etc.) is saved in advance, and the gate array (G.A.) 1704 for controlling supply of recording data to the recording head 31A, 31B as well as transfer of data among the interface 1700, MPU 1701 and RAM 1703. The blocks 1701, 1702, 1703 and 1704 construct the controller 1720.

A carrier motor 1710A transports the recording head 31A and a carrier motor 1710B transports the recording head 31B. The transport motor 1709 transports the recording medium. A head driver 1705A drives the recording head 31A and a head driver 1705B drives the recording head 31B. Motor drivers 1706, 1707A, 1707B are for driving the transport motor 1709 and carrier motors 1710A, 1710B, respectively. The control panel 1711 has keys for performing various setting and registration operations, a liquid crystal display for displaying messages and LED lamps which indicate the status of the apparatus.

In operation, the recording signal enters the interface 1700 from a host computer via the data transmission line 210, whereupon the gate array 1704 and MPU 1701 cooperate to convert the recording signal to recording data for printing.

The motor drivers 1706, 1707A, 1707B are driven into operation and the recording heads 31A, 31B are driven in accordance with the recording data sent to the head drivers 1705A, 1705B, as a result of which recording is performed.

The MPU 1701 is capable of executing processing for communicating with the host computer via the interface 1700. It is so arranged that memory information relating to the DRAM 1703 and resource data, as well as host computer recording information stored in the ROM, can be communicated to the host computer. This data and information can be communicated to the host computer even if ink in the ink tanks supplying ink to the recording heads 31A, 31B run out or even if the recording heads 31A, 31B or motors malfunction.

Described next as an example is a case in which four types of black toned pigment inks are used, a maximum of two ink dots o the same density are discharged for one pixel and a monochrome 256-tone X-ray transparency image for medical purpose is obtained as an output.

The functional construction of recording control in the ink-jet recording apparatus according to the second embodiment will be described with reference to FIG. 12.

Figure 12:
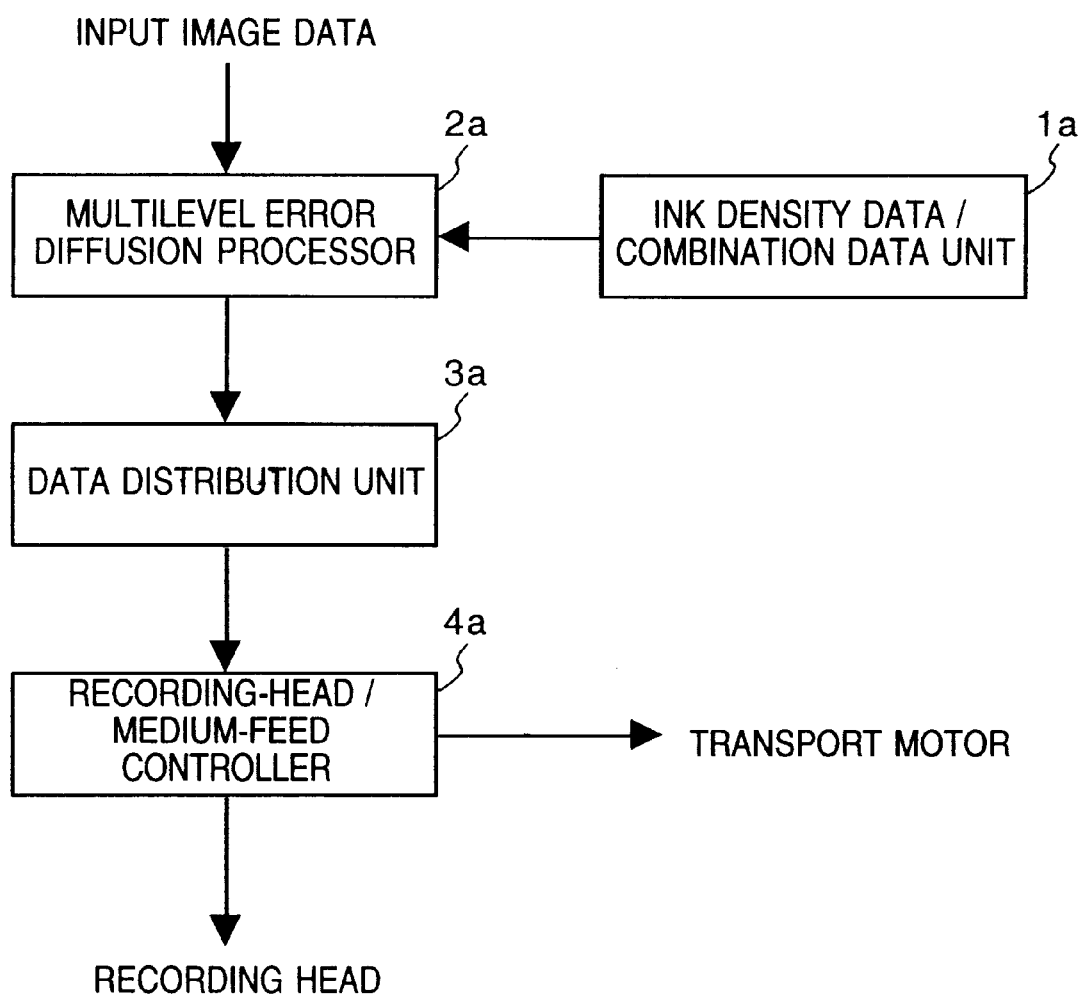
FIG. 12 is a block diagram showing the functional construction of recording control in the ink-jet recording apparatus according to the second embodiment of the present invention.

FIG. 12 is a block diagram showing the functional construction of recording control in the ink-jet recording apparatus according to the second embodiment of the present invention.

Figure 14:
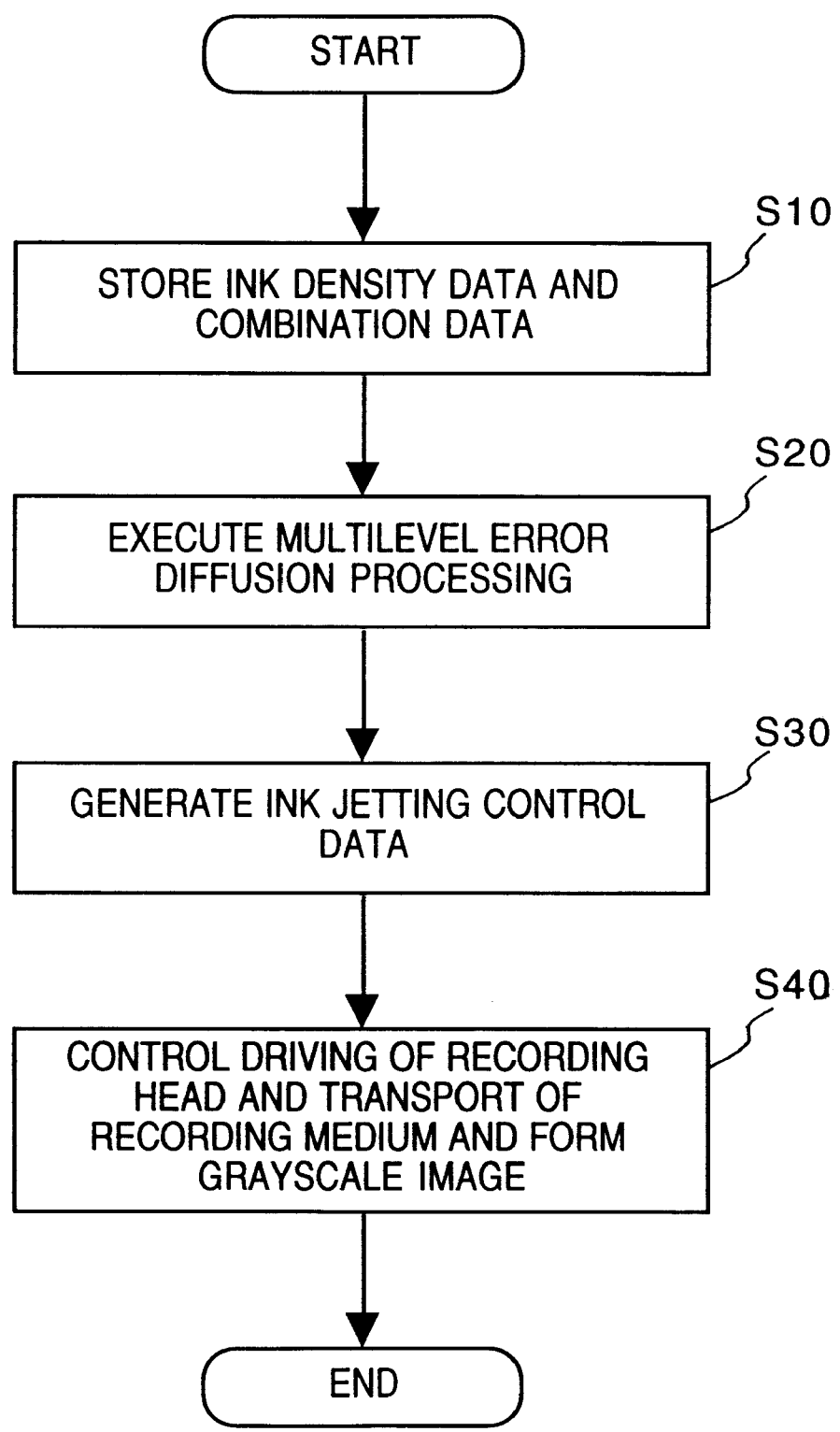
FIG. 14 is a flowchart illustrating a procedure for controlling the ink-jet recording apparatus according to the second embodiment of the present invention.
Figure 16:
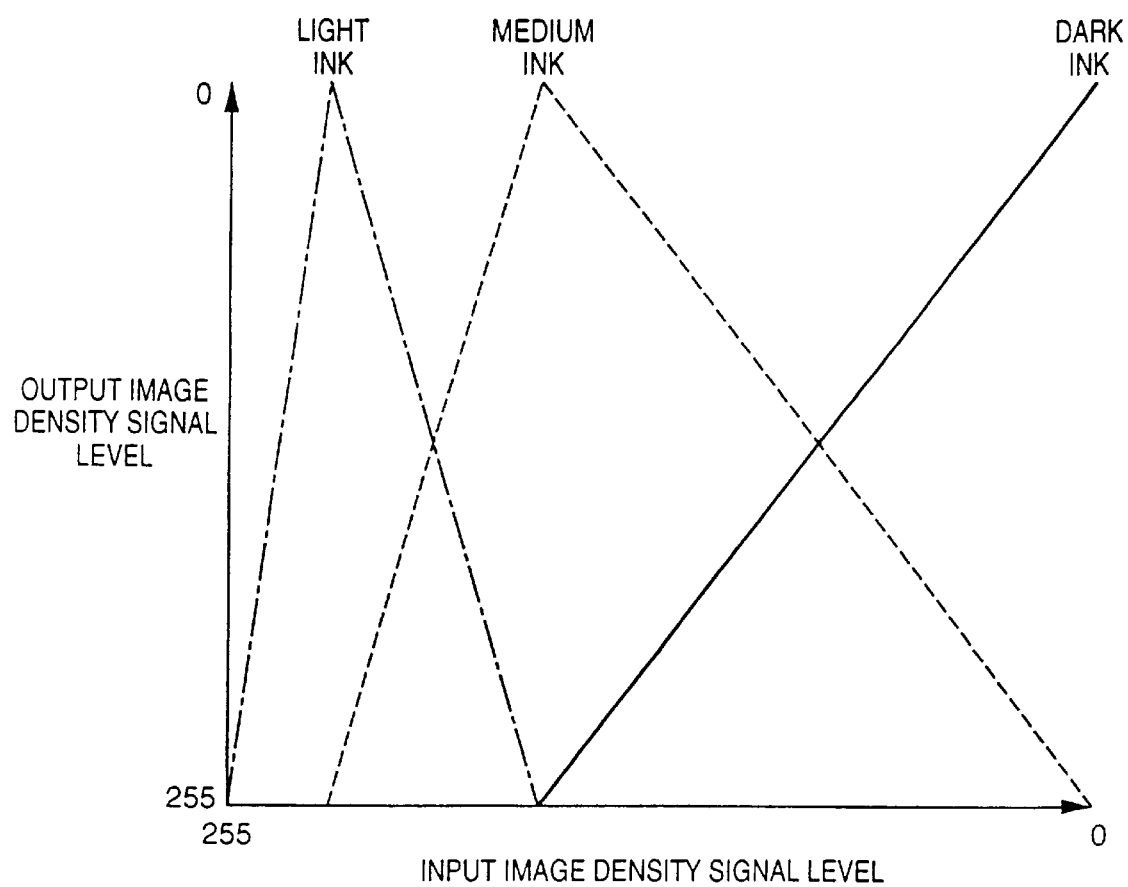
FIG. 16 is a diagram showing a tone allocation table according to the prior art.
Figure 17:
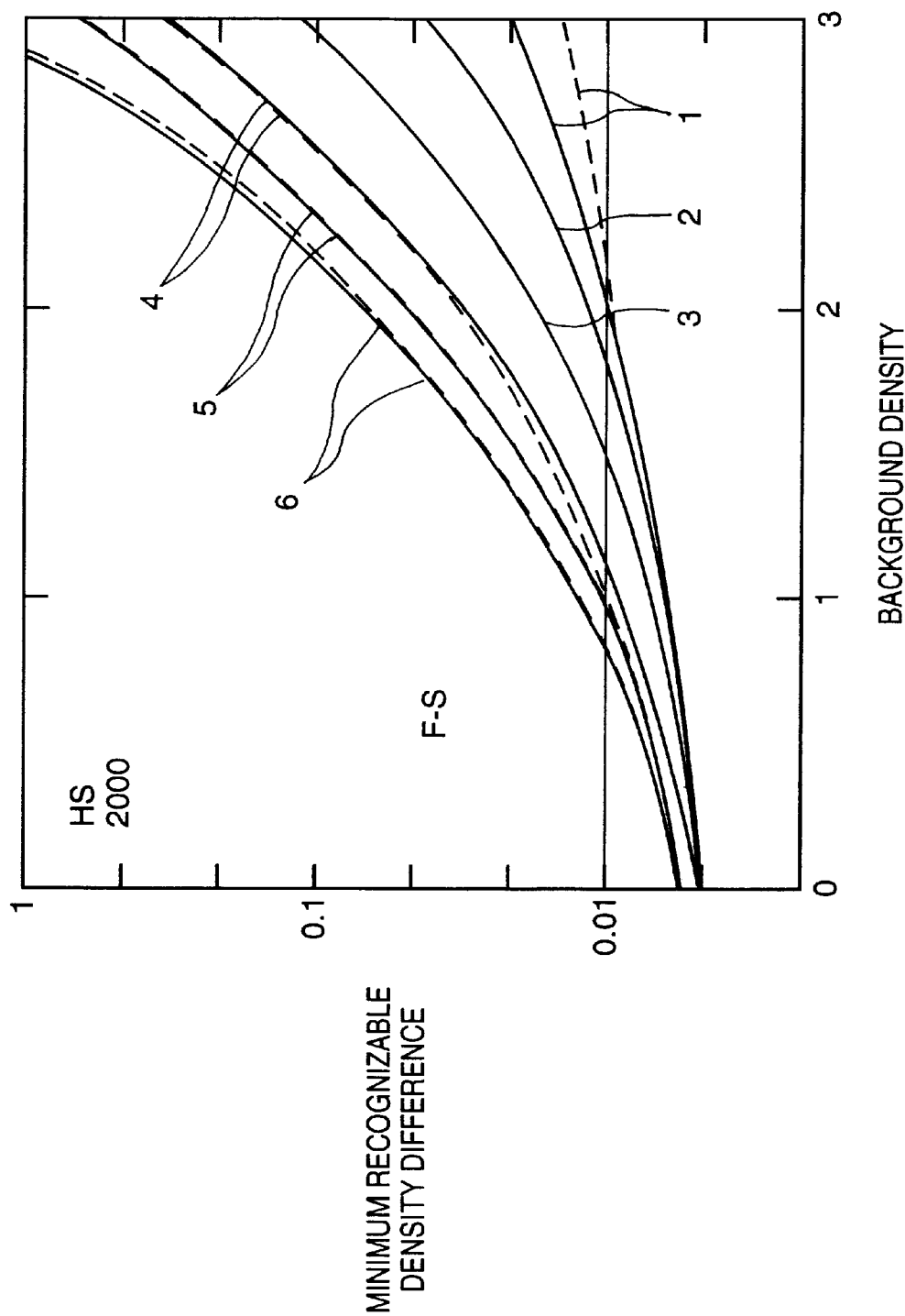
FIG. 17 is a graph illustrating the relationship between minimum recognizable density difference and background density.

According to the second embodiment, the functional arrangement described below is assumed to be implemented by processing executed by the MPU 1701. However, implementation can be by special-purpose hardware provided within the controller 1720. Further, it may be so arranged that the processing of the kind shown in FIG. 14 is executed in the host computer, multilevel data is produced and the data is transmitted to the ink-jet recording apparatus.

Shown in FIG. 12 is an ink density data/combination data unit 1a. The unit 1a stores combination data, which indicates a combination of ink types (four types for example, are employed in the second embodiment) used by the recording heads 31A, 31B, as well as ink density data prevailing at such time. The ink density data/combination data unit 1a is formed in the DRAM 1703. A multilevel error diffusion processor 2 a subjects input image data (of 256 tones) to multilevel error diffusion processing based upon the ink density data that has been accumulated in the ink density data/combination data unit 1a. In the second embodiment, a case in which the input image data is converted to 36-level image data is described as an example. However, desired multilevel error diffusion processing can be executed in conformity with the number of tones-capable of being expressed by the ink-jet recording apparatus. The details of multilevel error diffusion processing will be described later with reference to the flowchart of FIG. 14.

A data distribution unit 3a generates ink jetting control data, which indicates the types of ink to be distributed to the recording heads 31A, 31B, based upon the results of processing executed by the multilevel error diffusion processor 2a. A recording-head/medium-feed controller 4a controls the drive of the recording heads 31A, 31B and the transport of the recording medium based upon ink jetting control data produced by the data distribution unit 3a.

The inks used in the recording heads 31A, 31B of the second embodiment are indicated in Table 2 below. Four types of ink are used, as indicated in the table, and are designated by A, B, C and D in order of decreasing density. Table 2 also shows the pigment density (%) and optical density of each of the inks A through D. Each ink consists of a pigment and solvent, and the solvent contains various additives such as a surface-activate agent and a humectant. These additives control the jetting characteristic of ink jetted from the recording heads as well as the absorption characteristic of the ink in regard to the recording medium.

TABLE 2

| TYPE | A | B | C | D |
| --- | --- | --- | --- | --- |
| PIGMENT DENSITY | 2.32 | 1.23 | 0.41 | 0.14 |
| OPTICAL DENSITY | 1.02 | 0.54 | 0.18 | 0.06 |

Here the density ratio of the ink dots consisting of the inks used is 1:3:9:17. However, a ratio of 1:2:4:8 exists in the ratio of densities which are the sum of two dots. Accordingly, it is possible to establish density levels at substantially regular intervals in the low-density region.

In the case of these inks, it is possible to print ink of the same density twice for the same pixel and a total of 50 combinations can be formed. The number of tones capable of being expressed by a single pixel is 41, as shown in FIG. 13. In the second embodiment, an image is output using 36 of these tones. More specifically, the input image data (of 256 tones) is made 36-tone data to obtain the output image. The types of ink and the combinations thereof for expressing each of these 57 tones are illustrated in FIG. 13. The "No." column in FIG. 13 indicates each of the tones. In the columns "INK A" through "INK D", a double-circle mark indicates discharge of that ink from the recording heads 31A and 31B, a single circle mark indicates discharge of that ink from the recording head 31A (or 31B), and an "x" mark indicates that no ink is discharged for either head. The column "dl[i]" (where i is an integer of 0 to 35) indicates the ink density levels that express the respective tones. The column "th[i]" (where i is an integer of 0 to 35) indicates threshold values for deciding which of the 36 tones the input image data is to be made. The threshold value usually is determined as an ink density level at the midpoint between an ink density level of dl[k−1} and an ink density level of dl[k].

Combinations of types of ink that indicate each of the tones make up the combination data, and the ink density levels decided based upon the combination data make up the ink density data.

In the second embodiment, the multilevel error diffusion processor 2a uses the 36 ink density levels (dl[0]~dl[35]) and the 35 threshold values (th[1]~th[35]) to execute multilevel error diffusion processing which converts the input image data (of 256 tones) to image data of 36 tones. The multilevel error diffusion processing of the second embodiment has a plurality (36 in this case) of threshold values for subjecting the input image data to the multilevel conversion. This is a major departure from ordinary error diffusion processing. Though the multilevel conversion of the input image data is carried out using multilevel error diffusion processing in this embodiment, this does not impose a limitation upon the invention. For example, the multilevel conversion of the input image data may be performed using multilevel average density preservation, a multilevel dither matrix, a submatrix or other method of multilevel conversion.

A procedure for controlling recording by the ink-jet recording apparatus of the second embodiment will be described with reference to the flowchart of FIG. 14.

FIG. 14 is a flowchart illustrating a procedure for controlling the ink-jet recording apparatus according to the second embodiment of the present invention.

Ink-related data used by the recording heads 31A, 31B, which data includes the ink density data and combination data, is stored in the ink density data/combination data unit 1a at step S10. This is followed by step S20, at which the input image data is entered and multilevel error diffusion processing is applied to each pixel indicated by this input image data.

With regard to the details of this multilevel error diffusion processing, the multilevel error diffusion processing involving 57 levels in the first embodiment is performed with regard to 36 levels in this embodiment. Accordingly, this processing need not be described again.

Next, at step S30, the data distribution unit 3a generates the ink jetting control data, which controls the ink jetting operation of the recording heads 31A, 31B, based upon the above-mentioned combination data of FIG. 13 corresponding to the density data B(i,j) obtained by the multilevel (57-level) conversion processing. For example, if the density data B(i,j) is 117.7, then ink jetting control data is generated in such a manner that the recording heads 31A, 31B will each jet the ink D and the recording head 31A will each jet the inks A and B.

This is followed by step S40, at which the recording-head/medium-feed controller 4a controls the driving of recording heads 31A, 31B and the transport of the recording medium in accordance with the ink jetting control data, whereby a grayscale image is formed.

Described next will be a specific example of control for driving the recording heads 31A, 31B and for transporting the recording medium under the conditions set forth above.

First, the recording medium is transported to the recording starting position of the recording head 31A. Two-pass recording is performed by the recording head 31A, using the ink jetting control data corresponding to the recording head 31A, until the recording medium arrives at the recording starting position of the recording head 31B. That is, the recording head 31B stands by until the recording medium arrives at recording starting position of the recording head 31B. The ink jetting control data corresponding to the recording head 31B that is standing by is delayed until the recording medium arrives at the recording starting position of the recording head 31B. When the recording medium reaches the recording starting position of the recording head 31B, the ink jetting control data corresponding to the recording heads 31A, 31B is successively supplied to the recording heads 31A, 31B and two-pass recording is performed by each of the recording-heads 31A, 31B. By thus controlling the supply of ink jetting control data corresponding to the recording heads 31A, 31B, two-pass recording by each of the recording heads 31A, 31B, which recording is a characterizing feature of the invention, is achieved.

Thus, in accordance with the second embodiment, as described above, there are provided the recording heads 31A, 31B capable of discharging plural types of light and dark inks in the direction in which the recording medium is transported (i.e., in the sub-scan direction). In the formation of an image, recording is performed by discharging at least one pixel-forming ink dot. This makes it possible to increase the number of tones of a recorded image merely by mounting two recording heads, which are similar to that of the prior art, on the ink-jet recording apparatus through the set-up described above without newly fabricating a recording head capable of discharging many types of ink. In other words, an excellent grayscale image having a large number of tones can be obtained at least without making a large expenditure for the fabrication of a new recording head.

[Example 1 for Comparison]

Two recording heads capable of using four types of toned pigment inks was used to form an image in a manner similar to that of the second embodiment. Here multilevel error diffusion processing was executed using all ten of the grayscale values 0, 1, 3, 6, 9, 13, 19, 24, 29, 35 shown in FIG. 13, and a monochrome 256-tone medical X-ray transparency image was obtained as the output image.

When the output image was compared with that of the second embodiment, it was found that the dots in the output image were easily noticeable to the eye in the intermediate-density region to the low-density region, especially in the latter.

[Example 2 for Comparison]

A recording head capable of using eight types of toned pigment ink was employed and the number of types of ink printed for one and the same pixel was the maximum of eight. The inks used in Example 2 are as indicated in Table 3 below. Eight types of ink were used, as indicated in Table 3, and are designated by A, B, C, D, E, F, G and H in order of decreasing density. Table 3 also shows the pigment density (%) and optical density of each of the inks A through H.

TABLE 3

| TYPE | A | B | C | D | E | F | G | H |
|---|---|---|---|---|---|---|---|---|
| PIGMENT DENSITY | 4.00 | 2.00 | 1.00 | 0.50 | 0.25 | 0.125 | 0.0625 | 0.0313 |
| OPTICAL DENSITY | 1.88 | 0.89 | 0.44 | 0.22 | 0.11 | 0.06 | 0.03 | 0.01 |

In a case where the maximum of eight types of these inks are printed for one and the same pixel, 256 combinations are possible. This means that the number of tones capable of being expressed by one pixel is 256. Here the input image data (of 256 tones) was converted to 256 levels to obtain the output image. The types of ink and the combinations thereof for expressing each of these 256 tones are illustrated in FIG. 15. The "No." column in FIG. 15 indicates each of the tones. In the columns "INK A" through "INK H", a circle mark indicates discharge of that ink from the recording head and an "x" mark indicates that that ink is not discharged from the recording head. The column "dl[i]" (where i is an integer of 0 to 255) indicates the ink density levels that express the respective tones.

A monochrome 256-tone medical X-ray transparency image output was obtained using 256 tones per pixel.

In this case, some of the inks were found to be excessive in the output image. The results were unsatisfactory.

As indicated by Examples 1 and 2 for comparison with the first and second embodiments, the present invention is such that if there are n types of ink, any of the one through n types of ink are selected at will and the selected inks are discharged for the same pixel, whereby m levels (m >n+l) are obtained. A grayscale image is recorded by executing multilevel conversion processing, such as an in accordance with the m-level error diffusion method, m-level average density preservation method, m-level dither matrix method or sub-matrix method, based upon a pixel density for which the density level is low. An image having excellent tonality can be obtained as a result.

[Construction of Ink-jet Recording Apparatus]

Figure 18:
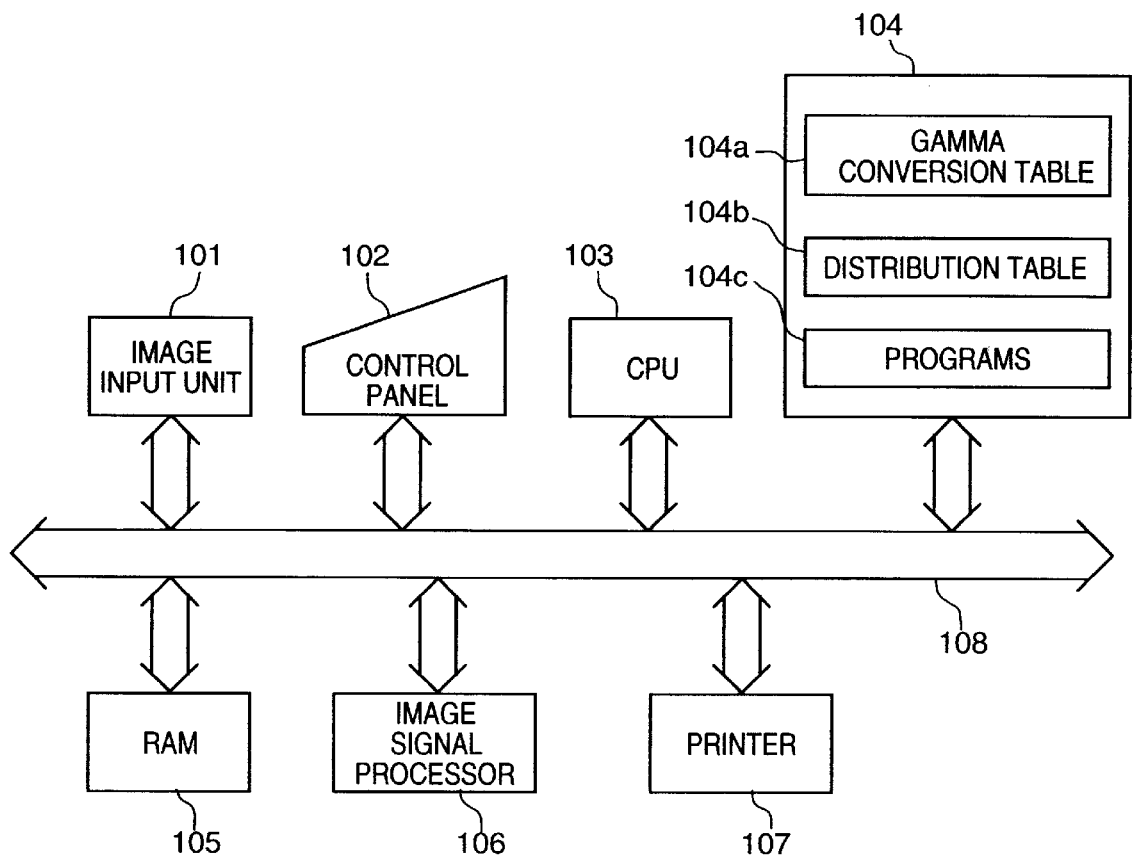
FIG. 18 is a block diagram illustrating the construction of an ink-jet recording apparatus according to a common embodiment of the present invention.
Figure 19:
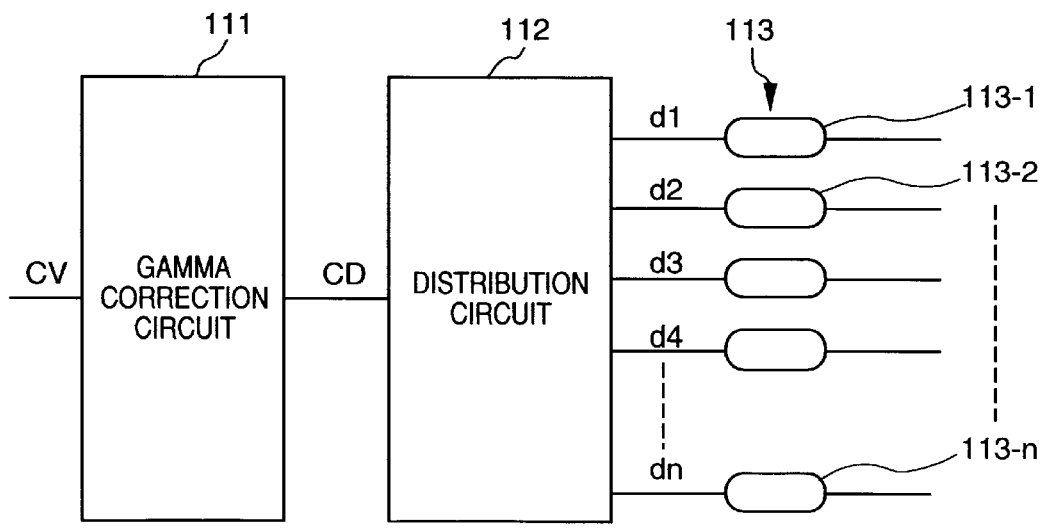
FIG. 19 is a block diagram illustrating the construction of an image signal processor shown in FIG. 18.

FIG. 18 is a block diagram illustrating the construction of an ink-jet recording apparatus applicable to the present invention, and FIG. 19 is a block diagram illustrating the construction of an image signal processor shown in FIG. 18.

As shown in FIG. 18, the apparatus includes an image input unit such as a scanner, a control panel 102 having keys for setting various parameters and for instructing the start of recording, and a CPU 103 for controlling the overall ink-jet recording apparatus in accordance with various control programs stored in a ROM 104. The ROM 104 stores operation control programs for operating the ink-jet recording apparatus in accordance with an error program. Stored in the ROM 104 are a gamma conversion table 104a referred to in processing executed by a gamma conversion table 111 shown in FIG. 19, a distribution table 104b referred to in processing by a distribution circuit 112, and various programs 104c such as a control program and operation program.

The apparatus further includes a RAM 105 used as a work area for the various programs stored in the ROM 104 and as a temporary saving area used at the time of error processing, an image signal processor 106 for executing image signal processing, described later, a printer 107 for forming a dot image based upon an image signal processed by the image signal processor 106, and a bus line 108 for transmitting an address signal, image data and control signal, etc., within the ink-jet recording apparatus.

The processing executed by the image signal processor 106 will now be described with reference to FIG. 19.

As shown in FIG. 19, the image signal processor 106 has the gamma correction circuit 111 and the distribution circuit 112. The gamma correction circuit Ill converts an input image signal CV to an image signal CD, which is indicative of density, using the gamma conversion table 104a.

Figures 21, 22:
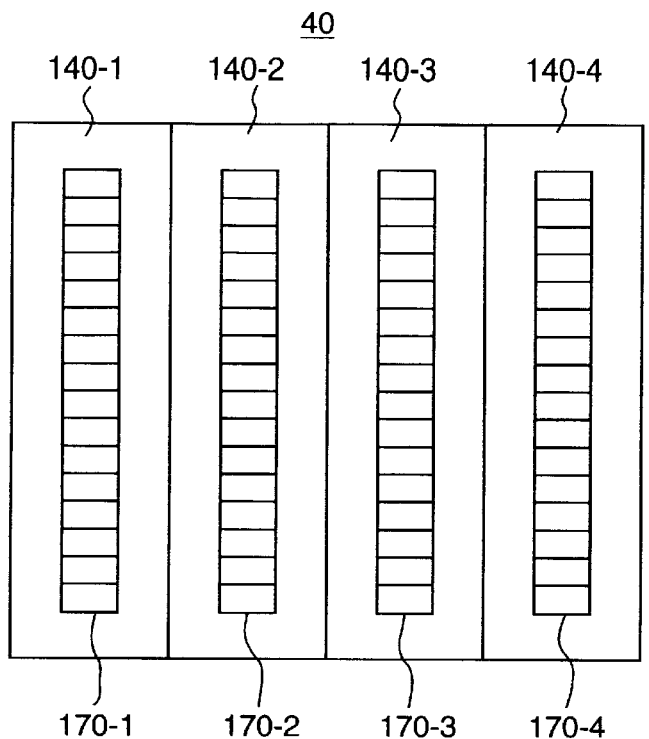
FIG. 21 is a diagram showing rows of ink discharge ports of ink-jet head units seen from the side of a recording sheet.
FIG. 22 is a diagram showing an image density signal distribution table according to a third embodiment.

The image density signal CD enters the distribution circuit 112, which uses a distribution table of the kind shown in FIG. 22 to form binarized signals d1, d2, d3, . . . , dn corresponding to ink-jet recording heads having different densities.

The ink-jet recording heads form a multiple-tone image by jetting inks from rows of corresponding ink discharge ports in dependence upon the binarized signals d1, d2, d3, . . . , dn.

Delay circuits 113-1, 113-2, . . . , 113-n adjust the ink discharge timings when ink from each ink discharge port row is printed in superposed fashion for one and the same pixel.

[Printer Construction]

The construction of the printer according to this embodiment will be described with reference to FIG. 20.

Figure 20:
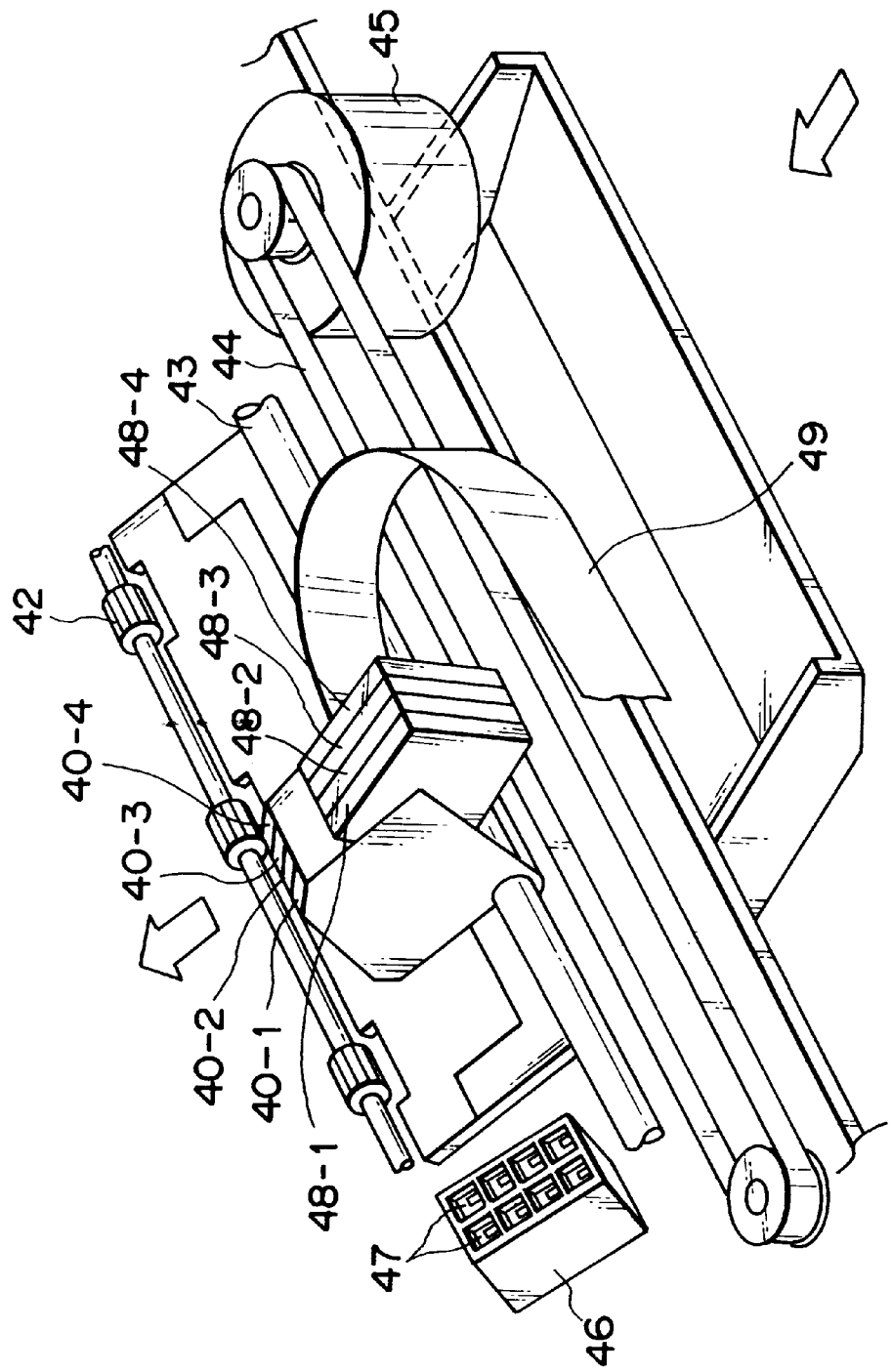
FIG. 20 is a perspective view showing the construction of a printer illustrated in FIG. 18.

As shown in FIG. 20, a plurality of ink-jet head units 140-1~140-4 are provided on a carriage 141. Each of the ink-jet head units 140-1~140-4 has a row of discharge ports for discharging ink. The rows of discharge ports of the ink-jet head units 140-1~140-4 are spaced a prescribed distance away from each other. Inks for the corresponding nozzle rows of the ink-jet head units 140-1~140-4 are supplied from a plurality of ink cartridges 148-1~148-4, respectively. The ink cartridges 148-1~148-4 supply inks D1, D2, D3, D4 to the ink-jet head units 140-1~140-4. The densities of these inks will be described later.

Control signals to the ink-jet head units 140-1~140-4 are sent via a flexible cable 149. A sheet recorded on is clamped by discharge rollers 142 via transport rollers (not shown) and is fed in the direction of the arrow as a transport motor (not shown) is driven. A guide shaft 143 is supported so that the carriage 141 will be guided by an encoder, not shown. The carriage 141 is moved back and forth along the guide shaft 143 in response to driving of a carriage motor 145 via a drive belt 144.

A heating element which generates thermal energy for discharging ink is provided within each ink discharge port (passageway) of the ink-jet head units 140-1~140-4. The heating elements are driven based upon the recording signal in keeping with the reading timing of the encoder, whereby ink droplets are caused to fly toward and adhere to-the recording sheet in the order of the inks D1, D2, D3, D4 so as to form an image.

The details of the internal structure of the ink-jet head units 140-1~140-4 are as disclosed in the specification of Japanese Patent Application Laid-Open No. 7-125262, for example, and need not be described here.

The arrangement of the ink discharge port rows and an example of recording of an image will now be described with reference to FIG. 21. FIG. 21 is a diagram showing rows of ink discharge ports of an ink-jet head units seen from the side of the recording sheet.

As shown in FIG. 21, the ink-jet head units 140-1~140-4 have discharge port rows 170-1~170-4, respectively, for discharging the inks D1~D4, respectively. The rows of the discharge ports of the ink-jet head units 140-1~140-4 have 256 discharge ports at a pitch of 600 dots per inch (600 dpi), and pixels of 256 dots can be recorded by a single scan in the sub-scan direction.

Further, the four types of ink D1~D4 can be discharged for one and the same pixel in a single scan so as to be superposed on one another. This makes it possible to record an image of a high tonality without prolonging recording time.

[Third Embodiment]

A method of setting ink density ratio for the ink-jet head units in accordance with a third embodiment will now be described. FIG. 22 is a diagram showing an image density signal distribution table according to the third embodiment.

A case in which an image is recorded using four types of ink will be considered first.

In a case where ink can be jetted up to four times for the same pixel to print overlapping dots without ink overflow and, moreover, the additivity requirement is met, the ratio of the densities of the inks D1, D2, D3, D4 can be made 1:2:4:8 and the combination of the jetted inks can be changed to maximize the number of tones. In FIG. 22, d1~d4 are signals which represent whether or not the inks D1~D4 are discharged. These are binary signals in which "1" means discharge of ink and "0" means no discharge of ink. If the image data is 10, for example, the inks D2 and D4 are printed in overlapping form on the same pixel.

Since the density ratio of the inks D1~D4 is set to 1:2:4:8, as mentioned above, image data of 0 to 15 can be expressed, without any densities being skipped, by the combinations of discharge/no discharge of the inks D1~D4.

Thus, if the ink densities are of n types and the sheet recorded on is capable of absorbing the amount of ink produced by n impacts for one pixel, then the density ratio of the inks for expressing the maximum number of tones can be expressed by Equation (5) below.

$$D1 : \cdots : Dn - 1 = 1 : \cdots : 2^{(n-1)} \qquad (5)$$

Further, the maximum number of tones at this time can be expressed by Equation (6) below.

$$\Sigma Di = \{1 + \ldots + 2^{(n-1)}\} + 1 = 2^n \qquad (6)$$

In other words, if there are inks of n types of densities, the number of tones per pixel can be set to a maximum of $2^n$ by combining inks at a density ratio of $1: \ldots :2^{(n-1)}$.

[Fourth Embodiment]

A density ratio according to a fourth embodiment will now be described. FIG. 23 is a diagram showing an image density signal distribution table according to the fourth embodiment.

In a case where inks D1~D5 of five types are used, as shown in FIG. 23, an image having 32 tones per pixel can be recorded by setting the density ratio of the inks D1~D5 to 1:2:4:8:16. The density ratio of inks does not strictly need to be a whole-number multiple. As long as the density ratio satisfies a density ratio where density tones are substantially linear, an image having a large number of tones can be recorded similar to the above-described case.

[Fifth Embodiment]

A density ratio according to a fifth embodiment will now be described. FIG. 24 is a diagram showing an image density signal distribution table according to the fifth embodiment.

In a case where there is a limit upon the amount of ink a sheet recorded on can absorb, there is a limit upon the number of times ink dots can be superposed on the same pixel. Accordingly, consider a case where ink will overflow without being absorbed by the film, resulting in a degraded image, if the number of overlapping ink impacts for one pixel is greater than three owing to recording conditions and environmental conditions.

In order to prevent such degradation of the image caused by ink overflow, consider a case where there are five types of inks D1~D5 and the number of overlapping ink impacts for one pixel is limited to three or less. As should be obvious from the distribution table shown in FIG. 23, the superposition of four types of inks D1~D4 is required in order to express image data 15. If the number of overlapping ink impacts is limited to three, therefore, density 15 cannot be expressed, meaning that this density will be skipped. Only 15 tones, namely image data 0 to 14, can be expressed without any densities being skipped.

Accordingly, if the ink density ratio is set to 1:2:4:7:14, as shown in FIG. 24, so as to obtain the maximum number of tones without any densities being skipped, 24 tones, namely image data 0, 1, . . . , 23, can be expressed.

Generally, if the number of overlapping ink impacts for one pixel is represented by m in a case where use is made of inks of such types that the ink density ratio is represented by $1:2: \ldots :2^{(n-1)}$, the number of tones that can be expressed continuously without density being skipped is limited to $2^{(m+1)}-1$, which results in a limitation upon the number of overlapping ink impacts for one pixel. However, by changing the combination of the jetted inks making up the density ratio in the manner described above, it is possible to realize a number of tones beyond the limits of the prior art.

[Sixth Embodiment]

A density ratio according to a sixth embodiment will now be described. FIGS. 25A and 25B are diagrams showing image density signal distribution tables according to a sixth embodiment.

Consider a case where the number of overlapping ink impacts for one pixel is limited to three or less using six types of inks D1~D6 in order to increase the number of tones. In this case, an ink density ratio of 1:2:4:7:14:24 or 1:2:3:6:10:20 is optimum, making it possible in either case to express 34 tones without skipping densities, i.e. differences of optical densities between the images recorded in each of consecutive the number of tones are substantially equal, as shown in FIG. 25A or 25B.

[Seventh Embodiment]

A density ratio according to a seventh embodiment will now be described. FIG. 26 is a diagram showing an image density signal distribution table according to the seventh embodiment.

If the sheet recorded on has a high absorbency, a further increase in the number of tones is possible.

In a case where the number of overlapping ink impacts for one pixel is limited to four or less using six types of inks D1~D6, an ink density ratio of 1:2:4:8:15:30 is optimum, making it possible to express 52 tones without skipping densities, as shown in FIG. 26. With respect to all the tones which can be expressed, the number of overlapping impacts is limited to the number smaller than the types of inks in accordance with the amount of ink absorbed by the recording medium, so that a high-quality image can be expressed without "ink overflow".

[Eighth Embodiment]

A density ratio according to an eighth embodiment will now be described. FIGS. 27A through 27C are diagrams showing an image density signal distribution table according to the eighth embodiment.

If a greater number of tones is required, it will suffice to increase the number of types of ink. In a case where the number of overlapping ink impacts for one pixel is limited to four or less using ten types of inks D1~D10, an ink density ratio of 1:2:3:6:10:20:34:68:102:136 is optimum, making it possible to express 170 tones without skipping densities, as shown in FIGS. 27A~27C.

Thus, when there are m types of inks of different densities and the relative densities of the inks are represented by D1, D2, ..., D, ... Dm in order of increasing density, it is possible to perform recording with a large number of tones and without skipping densities by arranging it so that an ith ink density Di will satisfy at the least the first condition, or the condition where the first condition and the second condition are combined:

[first condition]

$Di-1 < Di \leq 2 \cdot Di-1$ and Di is approximately a whole-number multiple of D1, $2 < i \leq n$, i: positive integer if i is 2, $Di = 2 \cdot Di-1$

[second condition]

$Dj-1 < Dj < 2$, j: positive integer

[Ninth Embodiment]

A density ratio according to a ninth embodiment will now be described. FIGS. 28A and 28B are diagrams showing image density signal distribution tables according to a ninth embodiment.

In the eighth embodiment described above, there are instances where image density takes on a value different from the set value owing, say, to a change in ink density. For example, as shown in FIG. 26, the density of image data 29 is expressed by printing overlapping ink dots of the four densities of inks D2, D3, D4 and D5, and the density of image data 30 is expressed by the density of ink D6 alone. If the proportion of ink D6 in the density ratio were to change from 30 to, say, 31, then 30 could no longer be expressed by at the density ratio and this density would be skipped in the image.

In order to prevent the above from occurring, setting the density of the high-density ink to a lower value is effective. This is because an absolute value of the density of high-density ink tends to change largely.

For example, the ink density ratio is set not to 1:2:4:8:15:30 but to 1:2:4:8:15:28 to lower the density of the high-density ink. The distribution table in such case is as shown in FIG. 28A. The number of tones that can be expressed by this ink density ratio is 50.

In this case, even if the proportion of ink D6 in the density ratio were to change from 28 to, say, 30, a correction would be possible as by calibration. By jetting ink D6, measuring the density of the image and modifying the distribution table to that shown in FIG. 28B in accordance with the density measured, the skipping of densities can be prevented in simple fashion. This makes it possible to form a high-tonality image and without the skipping of densities.

Thus, in accordance with these embodiments, an image exhibiting a high tonality can be produced through a simple arrangement using inks of a small number of types.

In particular, in a case where a large number of tones of 256 or more is required, as in an image for medical diagnosis, combining the method of the present invention with the error diffusion method or the like makes it possible to realize an image quality equivalent to that obtained with a printer for medical applications using silver chloride film.

Further, if use is made of a recording medium having an appropriately coated surface, it is possible to realize a simple, high-tonality printer capable of forming even a transparency image.

It should be noted that the present invention is not limited to a transparent original but can also be applied to a reflective original if it is a combination of ink and a recording sheet exhibiting additivity. The present invention can also be applied to an opaque original.

High-density, high-definition recording can be achieved especially if these embodiments of the invention employ ink-jet recording technology using means (e.g., an electro-thermal transducer or laser beam mechanism) for generating thermal energy as the energy utilized to discharge ink, wherein a change in the state of the ink is brought about by this thermal energy.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with recording information, to an electrothermal transducer arranged to correspond to a sheet or fluid passageway holding a fluid (ink). As a result, thermal energy is produced in the electrothermal transducer to bring about film boiling on the thermal working surface of the ink-jet head. Accordingly, air bubbles can be formed in the fluid (ink) in one-to-one correspondence with the drive signals. Owing to growth and contraction of the air bubbles, the fluid (ink) is jetted via an orifice so as to form at least one droplet. If the drive signal has the form of a pulse, growth and contraction of the air bubbles can be made to take place rapidly and in appropriate fashion. This is preferred since it will be possible to achieve fluid (ink) discharge exhibiting excellent response.

Signals described in the specifications of U.S. Pat. Nos. 4,463,359 and 4,345,262 are suitable as drive pulses having this pulse shape. It should be noted that even better recording can be performed by employing the conditions described in the specification of U.S. Pat. No. 4,313,124, which discloses an invention relating to the rate of increase in the temperature of the above-mentioned thermal working surface.

In addition to the combination of the orifice, fluid passageway and electrothermal transducer (in which the fluid passageway is linear or right-angled) disclosed as the construction of the recording head in each of the above-mentioned specifications, an arrangement using the art described in the specifications of U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink discharge portions of a plurality of electrothermal transducers, or Japanese Patent Application Laid-Open No. 59-138461, which discloses a configuration having openings made to correspond to the ink discharge portions, wherein the openings absorb pressure waves of thermal energy.

As a recording head of the full-line type having a length corresponding to the maximum width of the recording medium capable of being printed on by the recording apparatus, use can be made of an arrangement in which the length is satisfied by a combination of plural recording heads of the kind disclosed in the foregoing specifications, or an arrangement in which recording heads serve as a single integrally formed recording head.

The recording head may be of the replaceable tip-type, in which the connection to the apparatus and the supply of ink from the apparatus can be achieved by mounting the head on the apparatus, or of the cartridge type, in which the head itself is integrally provided with an ink tank.

In order to stabilize further the recording operation of the recording head, it is preferred that the recording apparatus of the embodiments be additionally provided with preparatory auxiliary means. Specific examples are pressurizing or suction means for the recording head, preheating means comprising an electrothermal transducer, or a heating element separate from this transducer or a combination of the transducer and the heating element, and a preliminary discharge mode for performing a discharge of ink separate from a discharge for recording purposes. These expedients are effective in achieving stable recording.

The recording mode of the recording apparatus is not limited to a recording mode solely for the mainstream colors such as black and white. The apparatus adopted can be one equipped with at least one recording head for a plurality of different colors or one full-color recording head using mixed colors, through it is desired that this be achieved by a recording head having an integrated structure or by a combination of a plurality of recording heads.

Further, the foregoing embodiments have been described on the assumption that ink is the fluid. The ink used may be one which solidifies at room temperature or lower, one which softens at room temperature or one which is a liquid at room temperature. In general, temperature control is performed in such a manner that ink viscosity will fall within a stable ink jetting range by adjusting the temperature of the ink itself so as to fall within a temperature range of no less than 30° C. to no greater than 70° C. Accordingly, it will suffice to use an ink liquefied when the printing signal is applied.

In order to positively prevent elevated temperature due to thermal energy by using this as the energy for converting the ink from the solid state to the liquid state, or in order to prevent evaporation of the ink, it is permissible to use an ink which solidifies when left standing but which is liquefied by application of heat. In any case, ink which is liquefied for the first time by thermal energy, such as an ink liquefied by application of thermal energy conforming to a printing signal and jetted as a liquid ink, or ink which has already begun to solidify at the moment it reaches the recording medium, can be applied to the present invention. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

The recording apparatus of the present invention may take on the form of an apparatus that is an integral part of or separate from an image output terminal of information processing equipment such as a computer, a copier in combination with a reader or the like, or a facsimile machine having a transmitting/receiving function.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus for recording a grayscale image on a recording medium based upon an input image data, wherein the recording medium is a transparent medium for recording a transparency image and includes an additive characteristic of adding optical density in accordance with a number of recording agents superposed on a pixel recorded on the recording medium, said apparatus comprising:

recording means for recording on the recording medium, said recording means having three or more types of recording agents of different densities but of a same color;

decision means for deciding a combination of the types of recording agents used to record the pixel of the grayscale image on the recording medium, the combination being decided based upon an optical density of the pixel; and control means for controlling the recording by said recording means based upon the input image data and the combination of recording agents decided by said decision means.

2. The apparatus according to claim 1, wherein said decision means includes:

memory means for storing density levels capable of being expressed by combining one or more of the recording agents possessed by said recording means, as well as information relating to combinations of the recording agents which express said density levels; and multilevel conversion means for converting the input image data to multiple levels based upon a density level that has been stored in said memory means, wherein a combination of recording agents used to record the pixel of the grayscale image on the recording medium is decided by being acquired from said memory means based upon the density level of the pixel of the input image data converted to multiple levels by said multilevel conversion means.

3. The apparatus according to claim 2, wherein said multilevel conversion means converts the input image data to a number of density levels that is greater than at least n+1, where n represents a number of the types of recording agents possessed by said recording means.

4. The apparatus according to claim 1, wherein said recording means is an ink-jet head for performing recording by jetting ink.

5. The apparatus according to claim 1, wherein said recording means is a recording head for jetting ink by utilizing thermal energy, said recording head having an electrothermal transducer for applying thermal energy to the ink.

6. A recording apparatus for recording a grayscale image on a recording medium based upon an input image data, wherein the recording medium is a transparent medium for recording a transparency image and has an additive characteristic of adding optical density in accordance with a number of recording agents superposed on a pixel on the recording medium, said apparatus comprising:

transport means for transporting the recording medium;

first recording means provided at a first position and having two or more types of recording agents of different densities but of a same color, for performing recording by being scanned in a direction perpendicular to a direction in which the recording medium is transported;

second recording means provided at a second position and having two or more types of recording agents of different densities but of a same color, for performing recording by being scanned in the direction perpendicular to the direction in which the recording medium is transported;

decision means for deciding a combination of the recording agents used to record the pixel of the grayscale image on the recording medium, wherein one or more of the recording agents possessed by each of said first and second recording means is included in the combination, the decision being based upon an optical density of the pixel; and control means for controlling the transport of the recording medium by said transport means and for controlling recording by said first recording means or by said first and second recording means based upon the input image data and the combination of recording agents decided by said decision means.

7. The apparatus according to claim 6, wherein said decision means includes:

memory means for storing density levels capable of being expressed by combining one or more of the recording agents possessed by each of said first and second recording means, as well as information relating to combinations of the recording agents which express the density levels; and multilevel conversion means for converting the input image data to multiple levels based upon a density level that has been stored in said memory means;

wherein a combination of recording agents used to record the pixel of the grayscale image on the recording medium is decided by being acquired from said memory means based upon the density level of the pixel of the input image data converted to multiple levels by said multilevel conversion means.

8. The apparatus according to claim 6, wherein said first and second recording means are ink-jet heads for performing recording by jetting ink.

9. The apparatus according to claim 6, wherein said first and second recording means are recording heads for jetting ink by utilizing thermal energy, said recording head each having an electrothermal transducer for applying thermal energy to the ink.

10. A method of controlling a recording apparatus for recording a grayscale image on a recording medium based upon an input image data, wherein the recording medium is a transparent medium for recording a transparency image and has an additive characteristic of adding optical density in accordance with a number of recording agents superposed on a pixel on the recording medium, said method comprising the steps of:

recording on the recording medium using recording means having three or more types of recording agents of different densities but of a same color;

deciding a combination of the types of recording agents used to record the pixel of the grayscale image on the recording medium, the combination being decided based upon an optical density of the pixel; and controlling the recording of the pixel by said recording step based upon the input image data and the combination of recording agents decided by said decision step.

11. The method according to claim 10, wherein said decision step includes:

storing, on a storage medium, density levels capable of being expressed by combining one or more of the recording agents possessed by said recording means, as well as information relating to combinations of the recording agents which express said density levels; and a multilevel conversion step of converting the input image data to multiple levels based upon a density level that has been stored on the storage medium by said storage step;

wherein a combination of recording agents used to record the pixel of the grayscale image on the recording medium is decided by being acquired from said storage medium, on which the combination was stored at said storage step, based upon the density level of the pixel of the input image data converted to multiple levels by said multilevel conversion step.

12. The method according to claim 11, wherein said multilevel conversion step converts the input image data to a number of density levels that is greater than at least n+l, where n represents a number of types of recording agents possessed by said recording means.

13. The method according to claim 10, wherein said recording means is an ink-jet head for performing recording by jetting ink.

14. The method according to claim 10, wherein said recording means is a recording head for jetting ink by utilizing thermal energy, said recording head having an electrothermal transducer for applying thermal energy to the ink.

15. A method of controlling a recording apparatus for recording a grayscale image on a recording medium based upon an input image data, wherein the recording medium is a transparent medium for recording a transparency image and has an additive characteristic of adding optical density in accordance with a number of recording agents superposed on a pixel on the recording medium, said method comprising the steps of:

transporting the recording medium;

firstly recording by scanning first recording means, said first recording means provided at a first position, which has two or more types of recording agents of different densities but of a same color, in a direction perpendicular to a direction in which the recording medium is transported;

secondly recording by scanning second recording means, said second recording means provided at a second position and having two or more types of recording agents of different densities but of a same color, in the direction perpendicular to the direction in which the recording medium is transported;

deciding a combination of the recording agents used to record the pixel of the grayscale image on the recording medium, wherein one or more of the recording agents possessed by each of said first and second recording means is included in the combination, the decision being based upon an optical density of the pixel; and controlling transport by said transporting step and controlling recording by said first recording or by said first and second recording based upon the input image data and the combination of recording agents decided by said decision step.

16. The method according to claim 15, wherein said decision step includes:

storing, on a storage medium, density levels capable of being expressed by combining one or more of the recording agents possessed by each of said first and second recording means, as well as information relating to combinations of the recording agents which express said density levels; and a multilevel conversion step of converting the input image data to multiple levels based upon a density level that has been stored on the storage medium by said memory step;

wherein a combination of recording agents used to record the pixel of the grayscale image on the recording medium is decided by being acquired from the storage medium, on which the combination was stored at said storage step, based upon the density level of the pixel of the input image data converted to multiple levels by said multilevel conversion step.

17. The method according to claim 15, wherein said first and second recording means are ink-jet heads for performing recording by jetting ink.

18. The method according to claim 15, wherein said first and second recording means are recording heads for jetting ink by utilizing thermal energy, said recording head each having an electrothermal transducer for applying thermal energy to the ink.

19. A recording apparatus having n (n>3) types of inks of different densities but of a same color for forming an image on a recording medium by jetting the inks from one or a plurality of nozzles, wherein the recording medium is a transparent medium for recording a transparency image and includes an additive characteristic of adding optical density in accordance with a number of inks superposed on a pixel on the recording medium, the image being formed, said apparatus comprising:

control means for controlling a size and a density of ink dots formed by a prescribed type of ink as being substantially constant; and record control means for controlling the forming of each pixel of the image by jetting a maximum of m number of ink dots from the n number of types of inks;

wherein a difference between an optical density level of the pixel and an optical density level neighboring the density level of the pixel is smaller in a low-density region than in a high-density region of the image.

20. The apparatus according to claim 19, wherein the relation $\Delta OD(max,high) \geq 2 - \Delta OD(max,low)$ holds, where $\Delta AOD$ (max, high) represents the maximum value of the difference between the density level of the pixel and the density level in the high-density region of the image, and $\Delta OD$ (max low) represents the minimum value of the difference between the density level of the pixel and the density level in the low-density region of the image.

21. The apparatus according to claim 20, wherein the relation m<n will hold in a case where the pixel is formed from the maximum of m ink dots and one is the maximum number of ink dots of the same density for the pixel, and such that the ink density ratio of m ink densities will be $D1:D2: \ldots :Dm=1:2: \ldots :2^{m-1}$ in a case where the densities of ink dots of different density but of the same color are D1, D2, Dm, . . . , Dn from the low density region.

22. The apparatus according to claim 19, wherein intervals of the density levels of the pixel in the low-density region are substantially constant.

23. The apparatus according to claim 22, wherein the relation m<n holds in a case where the pixel is formed from the maximum of m ink dots and one is the maximum number of ink dots of the same density for the pixel, and the ink density ratio of the m ink densities satisfies the relation $D1:D2: \ldots :Dm=1:2: \ldots :2^{m-1}$ in a case where the densities of ink dots of different density but of the same color are D1, D2, . . . , Dm, . . . , Dn from the low density region.

24. The apparatus according to claim 22, wherein the relation m/2<n holds in a case where the pixel is formed from the maximum of m ink dots and one is the maximum number of ink dots of the same density for the pixel, and, in a case where the densities of ink dots of different density but of the same color are D1, D2, . . . , Dm, . . . , Dn from the low density region, the density ratio of any m densities from among the m ink densities D1, D2, . . . , Dm, from the low density region or from among sums D1+D1, D2+D2, . . . , Dm+Dm of two ink densities taken from these ink densities D1, D2, . . . , Dm satisfies the relation $1:2: \ldots :2^{m-1}$.

25. A method of controlling a recording apparatus having n (n$\geq$3) types of inks of different densities but of a same color for a formation of an image on a recording medium by jetting the inks from one or a plurality of nozzles, wherein the recording medium is a transparent medium having an additive characteristic of adding optical density in accordance with a number of inks superposed on a pixel on said transparent medium, said method comprising the steps of:
controlling said formation of said image in such a manner that a size and a density of ink dots formed by a prescribed type of ink is substantially constant; and
controlling the formation of the image in such a manner that each pixel of the image is formed by jetting a maximum of m ink dots from the n types of inks; and
controlling a difference between an optical density level of the pixel and an optical density level neighboring the density level of the pixel in such a manner that the difference is smaller in a low-density region than in a high-density region of the image.

26. The method according to claim 25, wherein the relation $\Delta OD(max,high) \div 2 \cdot \Delta OD(max,low)$ holds, where $\Delta OD$ (max, high) represents the maximum value of the difference between the density level of the pixel and the density level in the high-density region of the image, and $\Delta OD$ (max,low) represents the minimum value of the difference between the density level of the pixel and the density level in the low-density region of the image.

27. The method according to claim 26, wherein control is performed such that the relation m<n will hold in a case where the pixel is formed from the maximum of m ink dots and one is the maximum number of ink dots of the same density for the pixel, and such that the ink density ratio of m ink densities will be $D1:D2: \ldots :Dm=1:2: \ldots :2^{m-1}$ in a case where the densities of ink dots of different density but of the same color are D1, D2, ..., Dm, ..., Dn from the low density region.

28. The method according to claim 27, wherein the relation m/2<n holds in a case where the pixel is formed from the maximum of m ink dots and one is the maximum number of ink dots of the same density for the pixel, and, in a case where the densities of ink dots of different density but of the same color are D1, D2, ..., Dm, ..., Dn from the low density region, the density ratio of any m densities from among the m ink densities DI, D2, ..., Dm from the low density region or from among sums D1+D1, D2+D2, ..., Dm+Dm of two ink densities taken from the ink densities D1, D2, ..., Dm satisfies the relation $1:2: \ldots :2^{m-1}$.

29. The method according to claim 27, wherein the relation m/2<n holds in a case where the pixel is formed from the maximum of m ink dots and one is the maximum number of ink dots of the same density for the pixel, and, in a case where the densities of ink dots of different density but of the same color are D1, D2, ..., Dm, ..., Dn from the low density region, the density ratio of any m densities from among the m ink densities D1, D2, ..., Dm from the low density region or from among sums DI+DL, D2+D2, ..., Dm+Dm of two ink densities taken from the ink densities D1, D2, ..., Dm satisfies the relation $1:2: \ldots :2^{m-1}$.

30. The method according to claim 25, wherein intervals of the density levels of the pixel in the low-density region are substantially constant.

31. The method according to claim 30, wherein the relation m<n holds in a case where the pixel is formed from the maximum of m ink dots and one is the maximum number of ink dots of the same density for the pixel, and the ink density ratio of the m ink densities satisfies the relation $D1:D2: \ldots :Dm=1:2: \ldots :2^{m-1}$ in a case where the densities of ink dots of different density but of the same color are D1, D2, ..., Dm, ..., Dn from the low density region.

32. A recording apparatus for forming a grayscale image on a recording medium by jetting at least three types of inks of different densities but of a same color from recording heads provided for corresponding types of inks, wherein the recording medium is a transparent recording medium having an additive characteristic of adding optical density in accordance with a number of inks superposed on a pixel on the transparent medium, and wherein a ratio $Dl: \ldots :Dn$ (n:positive integer) of the density values of a recorded image obtained in a case where each of the inks are jetted onto the recording medium satisfies at least the first condition,
$Di-1<Di\leq 2\cdot Di-1$ and Di is approximately a whole-number multiple of D1, $2<i\leq n$, i: positive integer, and
wherein the inks used are such that the sum of density values of recorded images formed by each of the inks is approximately equal to the density value of a recorded image obtained in a case where the image is recorded by superposing the inks, and the ratio $Dl: \ldots :Dn$ of the density values satisfies the condition where the first condition and the second condition $Dj-1<Dj<2-Dj-1$ (j: positive integer) are combined, said apparatus comprising:
setting means for setting a ratio of density values of the recorded image; and
control means for controlling a combination of inks jetted from each of the recording heads on the basis of the ratio of densities set by said setting means,
wherein the first condition and the second condition are combined such that differences of optical densities between the images recorded in each of the consecutive number of tones are substantially equal.

33. The apparatus according to claim 32, wherein said first condition satisfies $Di=2\cdot Di-1$ when i is 2.

34. The apparatus according to claim 32, wherein said recorded image is an image of medical purposes where the number of tones capable of being expressed by one pixel is sixteen or more tones.

35. The apparatus according to claim 32, wherein said optical density is an optical transparent density or an optical reflective density.

36. The apparatus according to claim 32, wherein said recording heads have a plurality of types of inks which have such a combination of density values of the inks that $2^{(m+1)}$ or more tones can be expressed, where m represents the maximum value of number of times ink is jetted in superposition for one pixel of the recorded image.

37. The apparatus according to claim 36, wherein said recording heads have a plurality of types of inks which satisfy the condition that the ratio of the density values of a recorded image obtained in a case where the inks are jetted onto the recording medium is approximately $1:2:4: \ldots 2^{(n-1)}$.

38. The apparatus according to claim 32, wherein the ratio $D1: \ldots :Dn$ of the density values of a recorded image obtained in a case where each of the inks are jetted onto the recording medium satisfies at least the third conditions,
$1:2:4: \ldots :2^{(i-1)}$, where $i\leq m$, m: positive integer
$Di-1<Di\leq 2\cdot Di-1$, where i>m and Di is
approximately a whole-number multiple of D1, where m represents the maximum value of number of times ink is jetted in superposition for one pixel of the recorded image;
wherein the ratio $D1: \ldots :Dn$ of the density values satisfies the condition where the third condition and the fourth condition $Dj-1<Dj<2\cdot Dj-1$, where j>m and Di is approximately a whole-number multiple of D1, are combined.

39. The apparatus according to claim 32, wherein the recording medium is a reflective member for recording a reflective image as the recorded image.

40. The apparatus according to claim 32, wherein the recorded image is an image for medical diagnosis.

41. The apparatus according to claim 32, wherein the recording head is an ink-jet recording head for performing recording by jetting ink.

42. The apparatus according to claim 32, wherein said recording head is a recording head for jetting ink by utilizing thermal energy, said recording head having an electrothermal transducer for applying heat to the ink.

43. A method of controlling a recording apparatus for forming a grayscale image on a recording medium by jetting at least three types of inks of different densities but of same color from recording heads provided for corresponding ones of the types of inks, wherein the recording medium is a transparent medium for recording a transparency image and has an additive characteristic of adding optical density in accordance with a number of inks superposed on a pixel on the transparent medium, and wherein a ratio $D1: \ldots :Dn$ of the density values of a recorded image obtained in a case where each of the inks are jetted onto the recording medium satisfies at least a first condition $Di-1 < Di \leq 2 \cdot Di-1$ and $Di$ is approximately a whole number multiple of $Dl$, $2 < i \leq n$, i: positive integer, and wherein the inks used are such that the sum of density values of recorded images formed by each of the inks is approximately equal to the density value of a recorded image obtained in a case where the image is recorded by superposing the inks, and the ratio $Dl: \ldots :Dn$ of the density values satisfies the condition where the first condition and the second condition $Dj-1 < Dj < 2 \cdot Dj-1$ (j: positive integer) are combined, and wherein the first condition and the second condition are combined such that differences of optical densities between the images recorded in each of the consecutive number of tones are substantially equal, said apparatus comprising:

a setting step of setting a ratio of density values of the recorded image; and a control step of controlling a combination of inks jetted from each of the recording heads on the basis of the ratio of densities set by said setting means.

44. The method according to claim 43, wherein said first condition satisfies $Di = 2 \cdot Di - 1$ when i is 2.

45. The method according to claim 43, wherein said recorded image is an image of medical purposes where the number of tones capable of being expressed by one pixel is sixteen or more tones.

46. The method according to claim 43, wherein said optical density is an optical transparent density or an optical reflective density.

47. The method according to claim 43, wherein said recording heads have a plurality of types of inks which have such a combination of density values of the inks that $2^{(m+1)}$ or more tones can be expressed, where m represents the maximum value of number of times ink is jetted in superposition for one pixel of the recorded image.

48. The method according to claim 47, wherein said recording heads have a plurality of types of inks which satisfy the condition that the ratio of the density values of a recorded image obtained in a case where the inks are jetted onto the recording medium is approximately $1:2:4: \ldots 2^{(n-1)}$.

49. The method according to claim 43, wherein the ratio $D1: \ldots :Dn$ of the density values of a recorded image obtained in a case where each of the inks are jetted onto the recording medium satisfies the at least third conditions, $1:2:4: \ldots :2^{(i-1)}$, where $i \leq m$, i: positive integer $Di-1 < Di \leq 2 \cdot Di-1$, where $i > m$ and $Di$ is approximately a whole-number multiple of $D1$, where m represents the maximum value of number of times ink is jetted in superposition for one pixel of the recorded image;

wherein the ratio $D1: \ldots :Dn$ of the density values satisfies the condition where the third condition and the fourth condition $Dj-1 < Dj < 2 \cdot Dj-1$, where $j > m$ and $Dj$ is approximately a whole-number multiple of $Dl$, are combined.

50. A recording apparatus for forming a image on a recording medium by jetting at least three types of inks of different densities but of a same color from recording heads provided for corresponding ones of the types of inks, wherein the recording medium is a transparent medium for recording a transparency image and has an additive characteristic of adding optical density in accordance with the number of inks superposed on a pixel on the transparent medium, said apparatus comprising:

recording control means for controlling a formation of a grayscale image such that a number of ink dots m printed in one pixel is smaller than a number of ink types n in all number of tones.

51. A method of controlling a recording apparatus for forming a image on a recording medium by jetting at least three types of inks of different densities but of same color from recording heads provided for corresponding ones of the types of inks, wherein the recording medium is a transparent medium for recording a transparency image and has an additive characteristic of adding optical density in accordance with the number of inks superposed on a pixel on the transparent medium, said method comprising:

a recording control step of controlling forming of a grayscale image such that a number of ink dots m printed in one pixel is smaller than a number of ink types n in all number of tones.

* * * * *

UNITED STATES PATENT AND TRADEMARK OFFICE
CERTIFICATE OF CORRECTION

PATENT NO. : 6,164,747
DATED : December 26, 2000
INVENTOR(S) : Masataka Yashima et al.

It is certified that error appears in the above-identified patent and that said Letters Patent is hereby corrected as shown below:

Title page,
Item [56], References Cited, FOREIGN PATENT DOCUMENTS, "07125262" should read -- 7-125262 --.

Column 6,
Lines 7, 42, and 54, "glayscale" should read -- grayscale --; and
Line 35, "for" (second ocurrence) should be deleted.

Column 7,
Lines 11 and 13, "having a" should read -- have an --.

Column 15,
Line 65, "formation-of" should read -- formation of -- .

Column 17,
Line 27, "not" should read -- not be --.

Column 33,
Line 16, "÷" should read -- $\geq$ --.

Column 35,
Line 21, "condition Di-1" should read -- condition, ¶Di-1 --.

Signed and Sealed this

Twenty-second Day of January, 2002

Attest:

Attesting Officer

JAMES E. ROGAN
Director of the United States Patent and Trademark Office